(12) United States Patent
Cook

(10) Patent No.: US 9,835,066 B2
(45) Date of Patent: Dec. 5, 2017

(54) EFFICIENCY AND EMISSIONS IMPROVEMENTS FOR NATURAL GAS CONVERSIONS OF EMD 2-CYCLE MEDIUM SPEED ENGINES

(71) Applicant: David Cook, Fullerton, CA (US)

(72) Inventor: David Cook, Fullerton, CA (US)

(73) Assignee: Clean Train Propulsion, Glendora, CA (US)

( * ) Notice: Subject to any disclaimer, the term of this patent is extended or adjusted under 35 U.S.C. 154(b) by 113 days.

(21) Appl. No.: 14/854,034

(22) Filed: Sep. 14, 2015

(65) Prior Publication Data

US 2016/0003117 A1    Jan. 7, 2016

Related U.S. Application Data

(63) Continuation-in-part of application No. 14/217,058, filed on Mar. 17, 2014, now abandoned.

(Continued)

(51) Int. Cl.
*F01N 3/04* (2006.01)
*F01P 3/02* (2006.01)
(Continued)

(52) U.S. Cl.
CPC .............. *F01N 3/046* (2013.01); *F01N 3/103* (2013.01); *F01N 3/2066* (2013.01); *F01N 13/0093* (2014.06); *F01N 13/10* (2013.01); *F01N 13/107* (2013.01); *F01N 13/1816* (2013.01); *F01P 3/02* (2013.01); *F01P 3/16* (2013.01); *F02B 19/1004* (2013.01); *F02B 19/1085* (2013.01); *F02B 19/12* (2013.01); *F02B 19/18* (2013.01); *F02B 37/24* (2013.01); *F02B 43/00* (2013.01); *F02M 21/0215* (2013.01); *F02M 21/0251* (2013.01); *F02M 21/0269* (2013.01); *F02M 21/0275* (2013.01); *F02M 21/0281* (2013.01); *F01N 2340/02* (2013.01); *F01N 2340/06* (2013.01); *F01N 2590/02* (2013.01);

(Continued)

(58) Field of Classification Search
CPC ...... F01N 3/046; F01N 13/0093; F01N 3/103; F01N 3/2066; F01N 13/10; F01N 13/107; F01N 13/1816; F01P 3/02; F01P 3/16; F01P 2003/006; F02B 19/00; F02B 19/1004; F02B 19/108; F02B 19/1085; F02B 19/12; F02B 19/18; F02B 37/24; F02B 43/00; F02M 21/0215; F02M 21/0251; F02M 21/0269; F02M 21/027
USPC ............ 123/41.72, 41.82 R, 251, 253, 41.55
See application file for complete search history.

(56) References Cited

U.S. PATENT DOCUMENTS

| | | | |
|---|---|---|---|
| 7,077,776 B2* | 7/2006 | Sorab ................. | F16H 57/0413 165/276 |
| 8,365,689 B2* | 2/2013 | Gruber .................... | F01P 3/16 123/169 PA |
| 2008/0184956 A1* | 8/2008 | Inui ........................ | F01L 1/022 123/193.5 |

* cited by examiner

*Primary Examiner* — Syed O Hasan
(74) *Attorney, Agent, or Firm* — Richards Patent Law P.C.

(57) ABSTRACT

A prechamber assembly includes a cylinder head including a coolant cavity, a prechamber body located within the cylinder head, the prechamber body including a nozzle, and an annular sleeve radially surrounding a portion of the prechamber body. The sleeve includes a plurality of coolant inlet holes. A portion of the prechamber body is radially spaced from the sleeve to form a coolant sleeve annulus extending along a length of the prechamber body above the coolant inlet holes. The coolant cavity and the coolant sleeve (Continued)

annulus are in fluid communication through the plurality of coolant inlet holes.

16 Claims, 23 Drawing Sheets

Related U.S. Application Data

(60) Provisional application No. 62/049,651, filed on Sep. 12, 2014, provisional application No. 62/128,296, filed on Mar. 4, 2015.

(51) Int. Cl.
| | |
|---|---|
| *F01P 3/16* | (2006.01) |
| *F02B 19/10* | (2006.01) |
| *F01N 3/10* | (2006.01) |
| *F01N 3/20* | (2006.01) |
| *F01N 13/10* | (2010.01) |
| *F01N 13/18* | (2010.01) |
| *F01N 13/00* | (2010.01) |
| *F02M 21/02* | (2006.01) |
| *F02B 19/12* | (2006.01) |
| *F02B 37/24* | (2006.01) |
| *F02B 19/18* | (2006.01) |
| *F02B 43/00* | (2006.01) |
| *F02B 75/02* | (2006.01) |

(52) U.S. Cl.
CPC ...... *F01N 2590/08* (2013.01); *F01N 2610/02* (2013.01); *F02B 19/108* (2013.01); *F02B 2075/025* (2013.01); *Y02T 10/125* (2013.01); *Y02T 10/144* (2013.01); *Y02T 10/24* (2013.01); *Y02T 10/32* (2013.01)

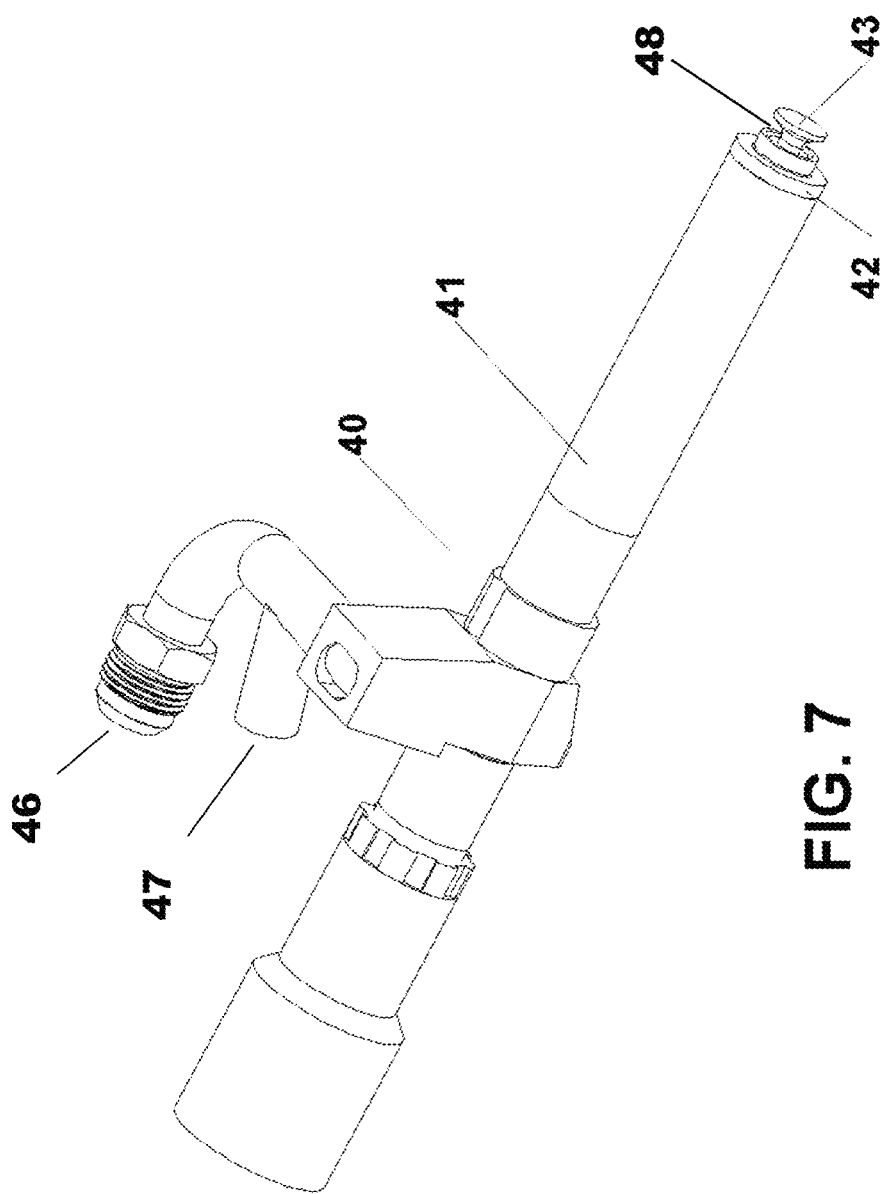

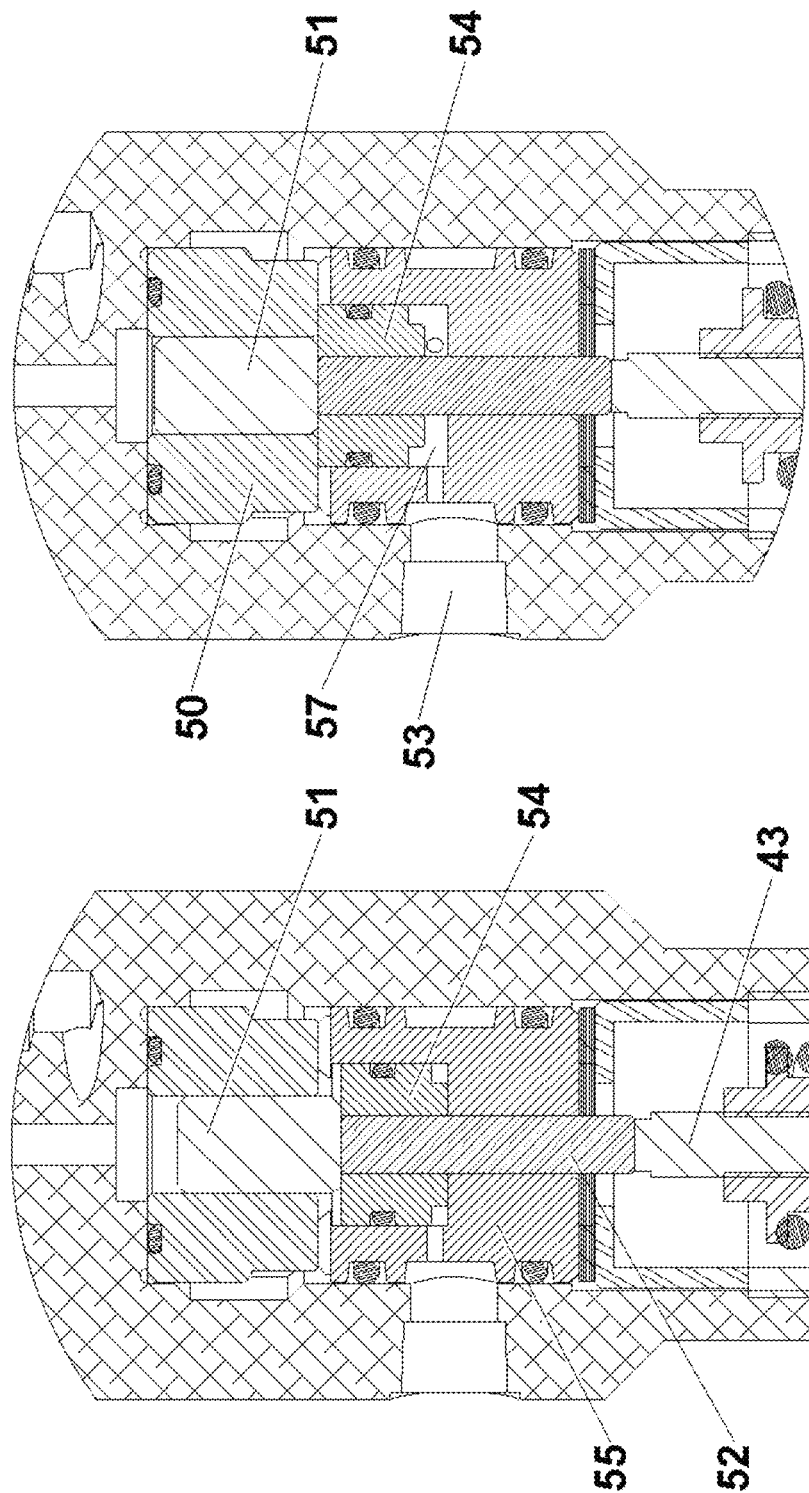

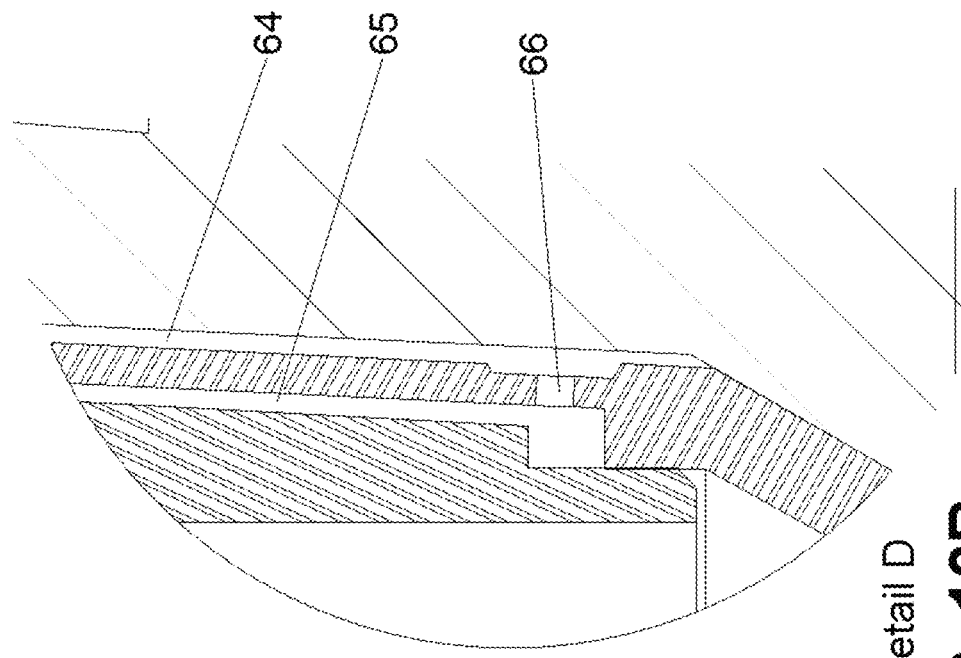
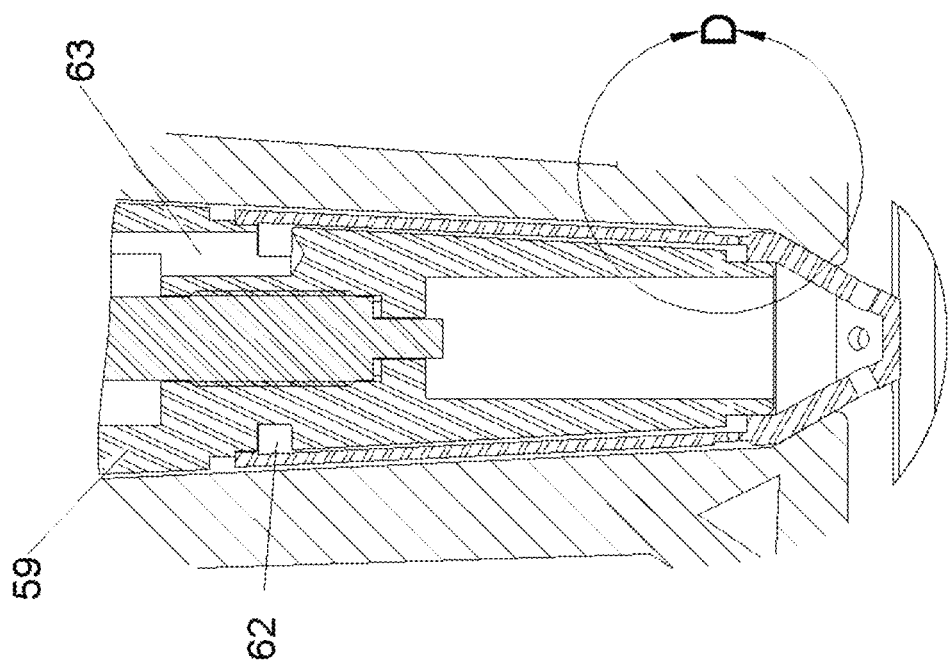
FIG. 12A
FIG. 12B
Detail D

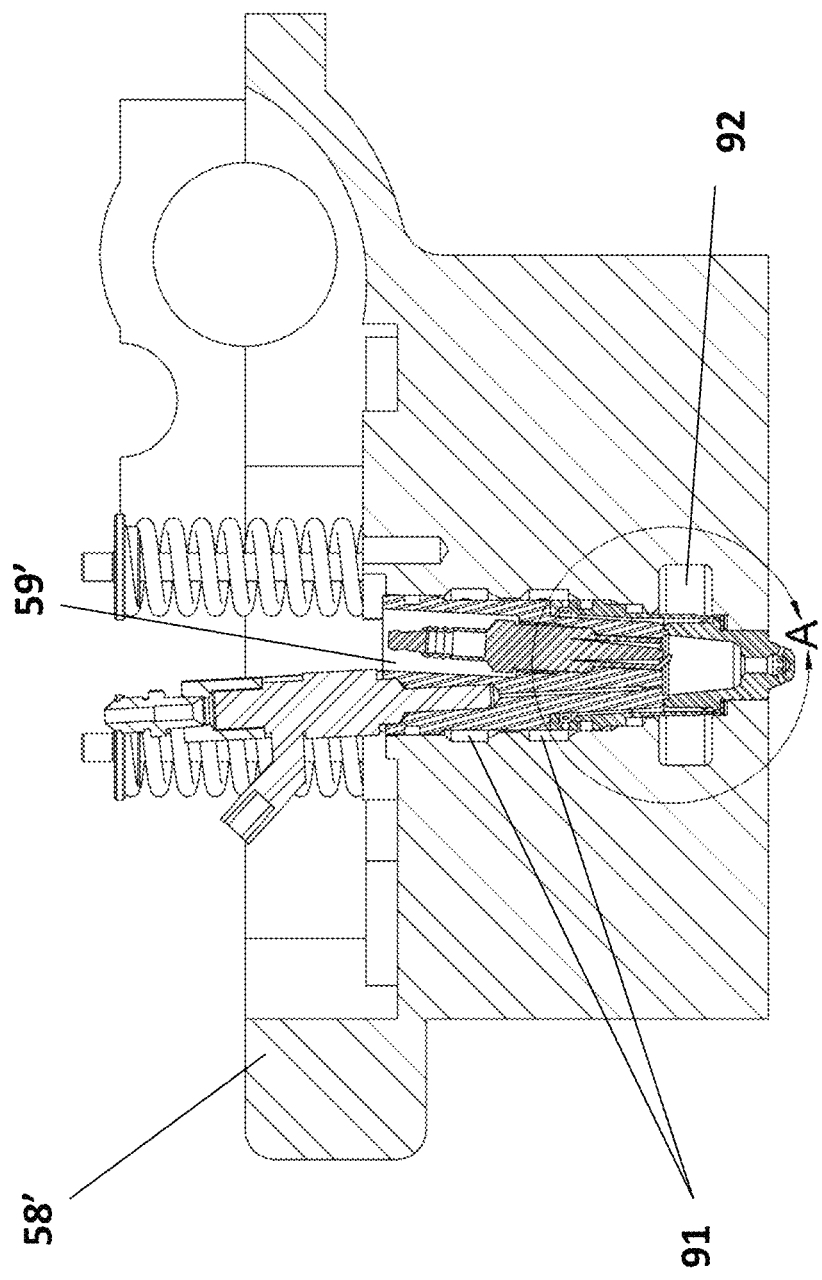

EMD 12 Cylinder

| Crank Angle to next Firing | Firing Crank Angle | Firing order | | | Firing order | Firing Crank Angle | Crank Angle to next Firing |
|---|---|---|---|---|---|---|---|
| 52.5 | 45 | 3 | 7 | 1 | 1 | 0 | 22.5 |
| 52.5 | 285 | 11 | 8 | 2 | 9 | 240 | 22.5 |
| 52.5 | 165 | 7 | 9 | 3 | 5 | 120 | 22.5 |
| 22.5 | 142.5 | 6 | 10 | 4 | 4 | 97.5 | 22.5 |
| 22.5 | 262.5 | 10 | 11 | 5 | 8 | 217.5 | 22.5 |
| 22.5 | 22.5 | 2 | 12 | 6 | 12 | 337.5 | 22.5 |

Flywheel End

Firing Order: 1, 12, 7, 4, 3, 10, 9, 5, 2, 11, 8, 6

EMD 12 Cylinder

| Crank Angle to next Firing | Firing Crank Angle | Split Firing Order | | | Split Firing Order | Firing Crank Angle | Crank Angle to next Firing |
|---|---|---|---|---|---|---|---|
| 75 | 45 | 2 | 7 | 1 | 1 | 0 | 45 |
| 75 | 285 | 6 | 8 | 2 | 5 | 240 | 45 |
| 75 | 165 | 4 | 9 | 3 | 3 | 120 | 45 |
| 75 | 142.5 | 2 | 10 | 4 | 1 | 97.5 | 45 |
| 75 | 262.5 | 4 | 11 | 5 | 3 | 217.5 | 45 |
| 75 | 22.5 | 6 | 12 | 6 | 5 | 337.5 | 45 |

Flywheel End

Split Firing Order: 1, 7, 3, 9, 2, 8

FIG. 15A

EMD 16 Cylinder

| Crank Angle to next Firing | Firing Crank Angle | Firing order | | | | Firing order | Firing Crank Angle | Crank Angle to next Firing |
|---|---|---|---|---|---|---|---|---|
| 22.5 | 45 | 3 | | 9 | 1 | 1 | 0 | 22.5 |
| 22.5 | 315 | 15 | | 10 | 2 | 13 | 270 | 22.5 |
| 22.5 | 135 | 7 | | 11 | 3 | 5 | 90 | 22.5 |
| 22.5 | 225 | 11 | | 12 | 4 | 9 | 180 | 22.5 |
| 22.5 | 247.5 | 12 | | 13 | 5 | 10 | 202.5 | 22.5 |
| 22.5 | 157.5 | 8 | | 14 | 6 | 6 | 112.5 | 22.5 |
| 22.5 | 337.5 | 16 | | 15 | 7 | 14 | 292.5 | 22.5 |
| 22.5 | 67.5 | 4 | | 16 | 8 | 2 | 22.5 | 22.5 |
| | | | | Flywheel End | | | | |

Firing Order: 1,8,9,16,3,6,11,14,4,5,12,13,2,7,10,15

EMD 16 Cylinder

| Crank Angle to next Firing | Firing Crank Angle | Split Firing Order | | | | Split Firing Order | Firing Crank Angle | Crank Angle to next Firing |
|---|---|---|---|---|---|---|---|---|
| 45 | 45 | 2 | | 9 | 1 | 1 | 0 | 45 |
| 45 | 315 | 8 | | 10 | 2 | 7 | 270 | 45 |
| 45 | 135 | 4 | | 11 | 3 | 3 | 90 | 45 |
| 45 | 225 | 6 | | 12 | 4 | 5 | 180 | 45 |
| 45 | 247.5 | 2 | | 13 | 5 | 1 | 202.5 | 45 |
| 45 | 157.5 | 8 | | 14 | 6 | 7 | 112.5 | 45 |
| 45 | 337.5 | 4 | | 15 | 7 | 3 | 292.5 | 45 |
| 45 | 67.5 | 6 | | 16 | 8 | 5 | 22.5 | 45 |
| | | | | Flywheel End | | | | |

Split Firing Order: 1, 9, 3, 11, 4, 12, 2, 10

FIG. 15B

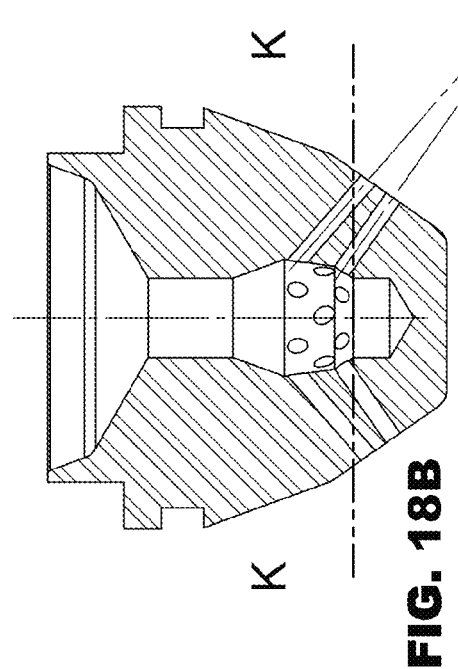
FIG. 18B
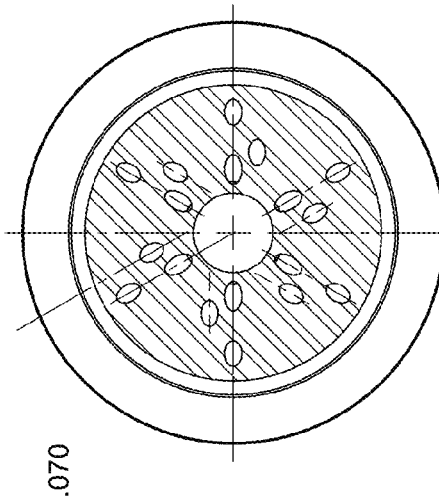
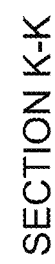
FIG. 18C
SECTION K-K
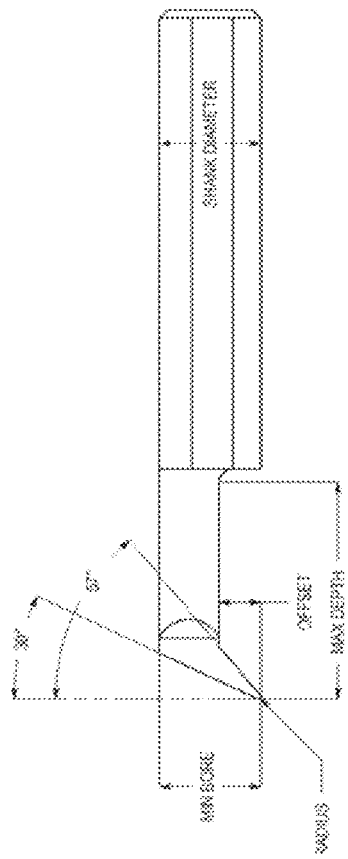
FIG. 17
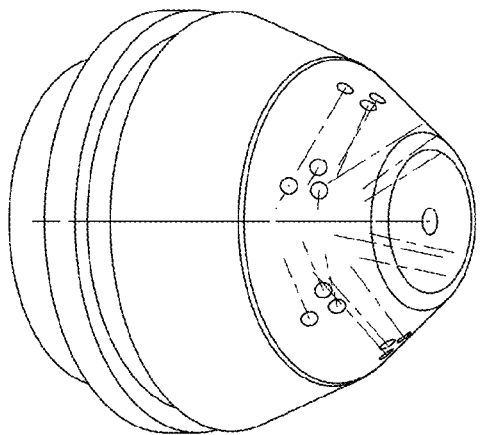
FIG. 18A

FIG. 22C SECTION J-J

EFFICIENCY AND EMISSIONS IMPROVEMENTS FOR NATURAL GAS CONVERSIONS OF EMD 2-CYCLE MEDIUM SPEED ENGINES

CROSS-REFERENCE TO RELATED APPLICATIONS

This application claims the benefit of priority to U.S. Provisional Application No. 62/049,651 filed on Sep. 12, 2014, and U.S. Provisional Application No. 62/128,296, filed Mar. 4, 2015, and is a continuation-in-part of U.S. application Ser. No. 14/217,058, filed Mar. 17, 2014, which claims the benefit of priority to U.S. Provisional Application No. 61/790,771 filed on Mar. 15, 2013, the disclosures of which are incorporated by reference herein.

BACKGROUND OF THE INVENTION

The first portion of the background is most closely related to a single element preturbine oxidation catalyst element for EMD turbocharged engines using twisted exhaust runners. Oxidation catalysts (OC) are used to reduce the emissions of unburned hydrocarbons (HC), carbon monoxide (CO) and certain types of particulate matter (PM). Of the aftertreatment systems used on lean burn engines, this is the simplest system as it is completely passive and practically maintenance free. In the art these are also commonly referred to as diesel oxidizing catalysts (DOC). When dealing with both diesel engines and gas engines the shortened term oxidation catalyst (OC) is the more appropriate term.

A very common use of an OC has been in the aftertreatment of diesel truck engines where the OC is placed downstream of the turbocharger, and upstream of the diesel particulate filter (DPF). Because locomotives have become so tightly packaged, there is minimal room for a downstream OC in the locomotive application. A solution to this called a V-Cat has been patented and developed by Miratech. With a V-Cat system the OC is built into the exhaust manifolds on the engine upstream of the turbocharger, hence a pre turbine OC. For packaging reasons, this system had a single OC substrate for each cylinder. ASME Paper JRCICE2007-40060 titled 'Exhaust Emissions From a 2,850 kW EMD SD60M Locomotive Equipped With a Diesel Oxidation Catalyst' describes the application and testing of prototype V-Cat system on a 16 cylinder EMD engine in an SD60M locomotive.

The primary parameter that determines the emissions reduction efficiency of an OC is its temperature. Results of the V-Cat testing in the ASME paper indicate the CO reduction efficiency reaches 90% at around 200 C, the peak HC reduction efficiency is approximately 50% at 320 C.

Not only does the preturbine placement of this OC system on the turbocharged EMD engine offer a solution to the packaging problem, preturbine placement of the OC has several other benefits.

As the efficiency of the OC is affected by temperature, its pre turbine placement will substantially increase its overall operating temperature. Notch 4 has a temperature drop across the turbo of 41 C. Notch 4 is when the preturbine temperature finally reaches 310 C where the OC starts to reduce HC at 50% efficiency. If the OC were downstream of the turbo in this case, it would be operating at the mid 40% range. At notch 8, the temperature difference across the turbo is 137 C.

These increases in preturbine temperature will be even more important in the future when methane becomes a regulated emission. Typical OC systems do not efficiently remove methane until 400 C. With a preturbine OC system this would start at notch 4, with a downstream OC this may not start until notch 7. When hydrocarbon emissions are regulated for natural gas engines, they regulate only non-methane hydrocarbons. In natural gas engines the methane component of total HC is typically close to 90%. Although methane is not a criteria pollutant with direct human health risks, air agencies are paying more attention to methane emissions as a potent greenhouse gas with regulations for it pending in the near future.

One interesting finding in the ASME report is that the preturbine OC actually increased the turbo inlet temperature and overall engine efficiency because of the energy released when it oxidized the CO, HC and PM matter. This led to an actual increase of engine thermal efficiency at some points even though the additional back pressure of the OC would typically cause a decrease in efficiency due to reduced airflow.

Another advantage of a preturbine OC over a downstream OC is the effect of the OC system back pressure. Downstream of the turbo, whatever back pressure the OC causes would be multiplied by the pressure ratio of the turbo turbine. So if the OC caused a pressure drop of 1.1 kPa and the turbo had a pressure ratio of 2.7, the back pressure increase in the exhaust manifold would be 2.9 kPa. In the case of the preturbine DOC, the OC pressure drop is not multiplied.

As noted, the V-Cat system tested in the ASME paper had a single OC substrate per cylinder. This system is now in production and sold exclusively by EMD the manufacturer of the EMD engines. Because of the way the exhaust manifold segments are tightly packaged across the top of the engine and there is only a short 4 inch length of common exhaust plenum before the turbo charger inlet plumbing, there was no easy way to package a single large substrate that all of the exhaust would flow through equally. The solution was to have a single OC substrate for each cylinder and therefore each cylinder would experience the same pressure drop and the engine would run smoothly. If a single large substrate was attempted and each cylinder was affected differently, performance would suffer as some cylinders would get more intake air than others.

In the report the pressure drop was measured across one substrate with the engine running, the measured pressure drop was 1.1 kPa. While accurately measured, this pressure drop is not representative of the instantaneous pressure drop that affects the scavenging of the cylinder and how much intake air is brought into the cylinder. Because the exhaust valves are open substantially and flowing exhaust for less than a ⅓ of the crank rotation, it is likely that this measured average pressure is actually ⅓ of what would be allowed with a single substrate for all of the cylinders when the exhaust pulses are all combined together into one average exhaust manifold mass flow.

Early versions of this single substrate per cylinder OC system suffered substrate failures that were attributed to the pulsing effect of the exhaust gases flowing rapidly through the substrate for only ⅓ of the crank rotation. This resulted in the substrates breaking up into small pieces and flowing through the exhaust manifold towards the turbo inlet. Fortunately the EMD engine has a built in debris screen installed in front of the turbo inlet to prevent material such as this from damaging the turbine blades. Later designs of the preturbine OC system overcame this problem by adding additional material and substrate supports to enhance the durability of the substrates.

While the existing preturbine OC solution for the EMD engine solves the packaging problem, it would be preferable if a more economical and simpler single substrate solution could be found that did not have to replace every one of the existing exhaust manifolds.

The second portion of the background is most closely related to adjustable inlet guide vanes for improved emissions in EMD locomotives. Two aftertreatment systems have been developed and tested for emissions reductions in EMD powered locomotives, and both test programs noted a spike in particulate matter (PM) emissions for notch 6 engine loading. Miratech has developed and patented a preturbine diesel oxidizing catalyst (DOC) system call the V-Cat, testing results were published in ASME Paper JRCICE2007-40060 titled 'Exhaust Emissions From a 2,850 kW EMD SD60M Locomotive Equipped With a Diesel Oxidation Catalyst'. This system was focused on reducing PM emission and from Notch 3 to Notch 8, the system efficiency averaged over 55% except for Notch 6 where the reduction plummeted to approximately ½ that value at 27%. Overall this system reduced PM by 52%.

Engine, Fuel and Emissions Engineering has trademarked its Compact SCR and the final report documenting its system on a Metrolink passenger locomotive is available on their website at www.efee.com. Unlike the preturbine V-Cat system, the Compact SCR system was located downstream of the engine turbocharger exhaust outlet and its primary function was to reduce oxides of nitrogen (NOx). It has a secondary function of reducing PM and was capable of reducing PM by 61% on the locomotive duty cycle. The testing with the Compact SCR resulted in a similar PM emissions spike at Notch 6 as seen in the V-Cat DOC testing. Further the NOx reduction efficiency of the Compact SCR system at throttle setting of idle through Notch 2 were very low.

The notch 6 increase in PM emissions and the low load reduction in NOx reduction efficiency are due to two different characteristics of the EMD 2 stroke locomotive engine. The notch 6 PM increase is due the engine air fuel ratio starting to be less lean than optimum which decreases combustion efficiency of the diesel spray and increases soot which is a major part of diesel PM. On the other hand the low load reduction in SCR efficiency is because the engine air fuel ratio is becoming too lean and the exhaust temperature is very low.

These varied air fuel ratios are a function of the design of the turbocharged EMD 2 stroke engine. The EMD system has a unique combination supercharger and turbocharger. It is driven by the engine geartrain through a one way clutch up until the point that there is enough exhaust energy to drive the turbocharger faster than the gear train. The point where the turbo spools up is typically notch 7 and that is where the boost builds up and the engine runs a leaner air fuel ratio that produces less PM. At very low loads the engine is also at low RPM, but at these lower speeds the intake ports are open for a longer time giving the reduced boost pressure more time to drive fresh air into the cylinder. Also at these lower loads the engine actually needs less air because it is making less power and consuming less fuel. This causes the engine to take in even more air than is needed and this excess air in the combustion chamber lowers the exhaust temperature. At idle this problem is at its worst as the low RPM allows a long time for scavenging and the minimal engine fuel consumption further drives down the exhaust temperature. From a peak exhaust temperature over 500 C at notch 8, the exhaust temperature is just over 110 C at idle and 160 C at Notch 1.

Energy Conversion Inc. (ECI) in Tacoma, Wash. has had to overcome an additional problem in its conversion of these EMD 2 stroke engines to natural gas. In order to prevent detonation at high loads with natural gas, it was required to lower the compression ratio of the engine. Lowering the compression ratio at idle exacerbated the low RPM combustion temperature issue and in order to get lower emissions at idle, ECI incorporated a bank idling system where it only injected fuel into the cylinders on one side of the engine. This allowed each cylinder to operate with twice the amount of fuel and generate twice the amount of power. Every two minutes the engine would swap banks and run on the other half of the engine.

In addition to the bank idling technique, ECI devised an inlet throttle system to restrict the amount of air that the engine took in at idle to further increase the combustion temperature and increase the exhaust gas temperatures. This system had a set of rotating vanes pointing inward from a ring. This ring would be in front of the turbocharger compressor and had an open and closed setting. In the open setting the vanes would turn so that they were lined up in the direction of airflow and offered minimal resistance to the airflow. In the closed position an air actuator would rotate the vanes almost 90 degrees until the vanes touched and closed off the air passage except for the small round opening left over at the tips of the vanes.

This inlet restriction system developed by ECI is similar to variable angle inlet guide vanes used on some gas turbine engines and large stationary compressor equipment. When the guide vanes are in the neutral position they have no effect on the compressor upstream of them. When the guide vane are rotated from the neutral position they will add swirl to the flow, this swirl will have a different effect on airflow through the compressor depending on whether the swirl is turning the airflow with or against the rotation direction of the compressor impeller. If the flow is swirling in the direction of the centrifugal impeller rotation then the amount of pressure rise across the impellor will decrease as the impellor will not be able to put as much work or energy into the flow. This would tend to decrease the amount of mass flow across the compressor and the boost pressure leaving it. If the inlet guide vanes were turned in the opposite direction, the resulting airflow swirl would turn the air against the impeller rotation. This would increase the amount of work or energy that the impellor will impart into the airflow increasing the pressure rise. If the centrifugal impellor was part of a turbocharger, this increase in pressure rise would result in slowing down the impeller and turbine. This could be a form of limited waste gating for limiting or reducing the turbocharger shaft speed.

In addition to the lower compression ratio causing lower combustion temperatures at lower loads, the ECI natural gas conversion systems changed the airflow configuration of the engine enough that the stock EMD turbocharger could overspeed at notch 8. In order to control overspeed ECI added a waste gate system to bypass some of the high temp exhaust gasses and reduce turbine speeds.

Another system implemented by ECI in its conversion system is improved aftercooling of the intake air to reduce detonation at high loads. At low loads this improved intake air cooling would exacerbate the low combustion temperature issues at lower throttle settings. The solution was to revert the aftercooling system back to the original system for notches 3 down to idle where heated engine coolant is used to warm up the intake air. This required adding an actuated coolant control valve and some plumbing to control whether heated or cooled water was flowing to the liquid cooled aftercoolers.

What would be beneficial in these applications would be an airflow control system that reduced the excessively lean low load mixtures, increased boost and airflow at notch 6, and limited turbine speed in dual fuel engines at notch 8.

The third portion of the background is most closely related to a sonic and dual stage gas inlet valve. In the case of the ECI conversions systems for 2 stroke locomotive engines, a system called low pressure direct injection (LPDI) is used where the natural gas is injected directly into the cylinder during the compression stroke. What this leads to is a mixing challenge where the air and fuel have limited time to mix as the piston rises up to top dead center right before ignition.

This mixing challenge is why SwRI on their single cylinder development EMD 710 engine decided to do pre-mixing of the air and fuel even though it would not be practical on an 'in service' engine as too much unburned fuel would blow through the cylinder into the exhaust while scavenging.

The in cylinder mixing issue can make prechamber operation difficult if a rich pocket of air and gas gets pushed into the prechamber which already has excess fuel in it. In this instance the prechamber will misfire and there will be no combustion for that stroke. For this reason ECI installed 'jet caps' on the first iteration spark ignited prechamber (SIP) system on the Napa Valley Wine train. The jet cap is an additional cap fixed over the end of the main Gas inlet valve (GIV). The GIV had a poppet valve at the end that controlled the flow of fuel gas into the combustion chamber. With the 'jet cap' in place, after the gas flowed thru the GIV body and past the poppet valve, it then had to flow through a small orifice at the end of the 'jet cap'. This addressed several issues, all the gas was converged into one flow stream that now had higher velocity and was pointed away from the prechamber.

Another difference between the ECI kit and the system tested at SwRI is that the ECI system has to operate at very high Lambdas. Lambda is the ratio of the actual air/fuel ratio divided by the stoichiometric air/fuel ratio. Typical 4 stroke diesel engines operate at Lambdas around 1.9 at low load to 1.4 at full power. The SwRI single cylinder development engine didn't have to operate below 50% power. At low loads, an EMD 2 stroke locomotive operates at Lambda's above 3 and at idle the Lambda can exceed 4. At these very high lambdas it would require a larger prechamber that will produce fewer NOx emissions and have a lower thermal efficiency.

A solution to the very high Lambda value is to restrict inlet flow with a throttling system at low loads. This will allow operating the engine all the way from idle to full load with smaller volume prechambers that put out less NOx emissions and operate at higher thermal efficiency.

In a uniflow 2 stroke engine, scavenging is a process of blowing inlet air over the top of the piston at bottom dead center. This entering intake air pushes the spent combustion gasses out through the open exhaust ports at the top of the cylinder. The amount of in cylinder air motion and mixing as the piston rises in the compression stroke is proportional to how much velocity the inlet air carried in with it due to excess intake air box pressure. When the inlet is throttled to help reduce the low load air fuel Lambda, a large portion of this mixing energy is lost.

It is possible to reduce the inlet air box pressure to a low enough value that not enough inlet air enters to thoroughly scavenge the cylinder and some amount of exhaust gas will remain in the cylinder when the exhaust valves close. This effect can be desirable or have negative effects. This left over combustion gas is much hotter and less dense than the incoming air, so the resulting in cylinder air mass will now be lower and the average in cylinder temperature will be hotter at the beginning of the compression stroke. This has the double effect of both lowering the Lambda for easier combustion with less ignition energy using a smaller prechamber, and also faster and more efficient combustion because the compressed air fuel mixture is already much hotter at ignition.

This is referred to as internal exhaust gas recirculation (EGR) where exhaust gas is purposely left behind to achieve these effects. In a uniflow 2 stroke, the downside of this is much less air velocity at intake port closing. This lowered in cylinder velocity and mixing energy reduces the amount of air and fuel mixing when the natural gas is injected at low loads.

A supersonic injector for gaseous fuel engines as described in U.S. Pat. No. 6,708,905 would be a solution that offers improved mixing and a bonus of lower temperature gas when injected. This particular device has two drawbacks. First it has many machined parts with complicated features that will be costly. Second, the design has a built in cavity where residual natural gas will be compressed into and remain unburned during the combustion event. Most of the compressed gas in this cavity will become methane exhaust emissions. This release of unburned methane is both a pollution emissions problem and an energy efficiency problem.

What is desired is an economical and practical way to achieve the benefits of a high velocity and focused sonic injection nozzle without the added cavity for residual unburned methane, better mixing in the combustion chamber of a natural gas engine with direct gas injection which would allow operating a uniflow 2 cycle engine to be throttled past the point that internal EGR effects are improving combustion.

The fourth portion of this background is most closely related to prechamber cooling sleeves. Prechamber ignition systems are used to ignite air fuel mixtures that are too lean for a spark plug to ignite. The type of prechamber discussed here is a small prechamber at less than 5% of the combustion chamber clearance volume. Combustion inside of the prechamber will be easier to start and burn much more rapidly because the air fuel mixture is hotter and typically richer than the air fuel mixture in the main combustion chamber.

The cooling of a prechamber is one of the challenges, and the most challenging part of the prechamber to cool is the nozzle or tip area. This is because there is combustion happening on both sides of it. With insufficient cooling it has been documented that overheating prechambers will often melt the tip of the prechamber. Sometime before the tip actually melts, it will cause preignition which will limit how much power the engine can produce or cause the engine to run improperly during some conditions.

An improved prechamber would be a design that has better cooling for the prechamber body, prechamber tip and nozzle area while also being more economical to make.

The fifth portion of this background is most closely related prechamber cylinder deactivation on spark ignited prechamber EMD engines. Both the roots blown and turbocharged EMD engines would be good candidates for cylinder deactivation. Currently ECI used skip firing in their Spark Ignited Prechamber systems to improve combustion at very low loads where the engine operates very lean. In skip fire, the engine controller will skip actuating the main injector for a certain cylinder. This will cause the other cylinders to have to operate at a higher power to make up the lost power from the deactivated cylinders. When operating at higher power the other cylinders will need more fuel to generate it and this increase in fuel to those cylinders is what decreases how lean those cylinders are before ignition which generates higher heat release rates making the combustion events more consistent, and efficient. The control system has a strategy to alternate the deactivated cylinders to prevent any one cylinder from becoming significantly cooler than the others and also to prevent lube oil build up in that cylinder.

To keep the system simple, only the main gas injector is turned off for the cylinders that are skipped. All of the engine prechambers are still fed natural gas and the spark plugs are still fired. In the case where the prechamber supply pressure can be held constant over the entire engine operating range, the prechamber fuel supply system consists of only a single mechanical pressure regulator with a fixed setting.

Because the prechamber is still fed fuel, but the main chamber is not, there is no guarantee that the mixture in the prechamber is being burned when a cylinder is deactivated, even when the spark plug is still being fired. A portion of the fuel burned in the prechamber during normal combustion was not injected by the prechamber fuel system, but was brought in from the main chamber. When the cylinder is deactivated the air pushed into the prechamber by the piston will not have any fuel so the overall mixture in the prechamber may be too lean for the spark to burn. This is greatly dependent on engine speed and load while being skip fired. Because skip fire happens at low load it's likely that the extended time the system gets to fill the prechamber offsets this deactivated cylinder issue, but at the same time the operating cylinders are running richer and having the deactivated cylinders prechambers rich enough to fire may make the activated prechambers too rich causing misfires or combustion instability.

With these issues in mind, prechambers that are fed fuel in deactivated cylinders are likely to generate more NOx or HC or both. The generation of Non-Methane HC emissions is especially problematic as after the spark plug initiates combustion in the prechamber some unburned natural gas is pushed out of the prechamber into the main chamber before it is burned inside the prechamber.

The sixth portion of this background is most closely related to continuous water injection for ECI converted engines. Water injection has been used in engines to reduce engine knock at higher power levels as far back as World War 2. It was commonly used to allow aircraft engines to generate extra power during takeoff and other possible events that needed the most power possible.

It has also seen some use in racing applications, typically in sprint type racing where the time duration of full power and water injection use is limited, thus avoiding a bulky and heavy water storage system.

There are several issues that make water injection not worth the effort of implementation in most mobile applications; one is the volume and weight of the consumable water and second is the need to refill the container that would store it. Once these issues are overcome, then there is the environmental issue of keeping the stored onboard water from freezing when the vehicle is not in operation.

Another issue is the challenge of corrosion to the hardware that would be used to inject it, especially if the injector is designed to open and close rapidly for each cylinders combustion cycle.

Finally is the corrosion issue as related to any other parts. If after shut down an injector would leak water into the engine cylinder during engine storage, that cylinder will have internal corrosion and suffer significant maintenance issues.

Several Papers have indicated that direct injection of water into the engine cylinder has several advantages in addition to reducing engine knocking SAE paper 2009-01-1925 Effect of In Cylinder Water Injection Strategies on Performance and Emissions of a Hydrogen Fueled Direct Injection Engine is one good example. In this paper it is indicated that water injection both lowered NOx emissions and increased the indicated thermal efficiency when the water injection happened during the compression stroke. This effect was much less when the water was injected during the intake stroke on the four stroke engine tested.

When converting a diesel engine over to operate on natural gas, the compression ratio is typically reduced. If it wasn't reduced the engine may be limited to only generation of 60% of its original diesel operation rated power. The addition of water injection could allow the retention of higher compression ratios.

BRIEF SUMMARY OF THE INVENTION

The first portion of the summary is most closely related to a single element preturbine oxidation catalyst element for EMD turbocharged engines using twisted exhaust runners. With one revised exhaust manifold segment there is a way to use a single OC substrate without significantly affecting the exhaust flow of the cylinder closest to the turbocharger. This single substrate would replace the debris screen at the inlet to the turbo. This substrate would be installed in the last exhaust manifold segment before the turbo. Room for the substrate would be created by modifying the exhaust manifold runners for the last two cylinders.

The typical exhaust runners are a 9"×4" rectangular tube. The 9 inch dimension on the runner is along the axial flow path of the exhaust manifold segment. By having the rectangular tube transition from a 9"×4" shape to a 4"×9" shape as it meets the exhaust manifold segment, it will free up approximately 5" of axial length for a 5" long OC substrate.

This single substrate system will save the cost of making 3 extra exhaust manifold segments and 15 extra OC substrates.

By averaging the exhaust pulses all together in one flow, it minimizes the pulsing effect on the substrate and the substrate experiences relatively consistent and smooth exhaust flow.

By replacing the original debris screen it removes the effect of the pressure drop of the screen which helps to offset the pressure drop of the OC substrate on engine performance.

The holes in the OC substrate will be smaller than the holes in the original debris screen so it will be more effective at stopping smaller bits of debris from damaging the turbine blades and reducing the turbo performance.

The long OC substrate in front of the turbo converging duct acts as a flow straightener removing any swirl in the flow that may have been caused by the exhaust runner pulses entering the exhaust manifold close to the turbo inlet.

The second portion of the summary is most closely related to adjustable inlet guide vanes for improved emissions in EMD locomotives. With minor development and the addition of a modulated position actuator, the ECI inlet throttle system could be used to variably reduce the airflow in the EMD engine in very small increments. If the modulated position actuator had more than 90 degrees of travel it could also be used to increase boost at notch 6 and decrease turbine speed at notch 8.

The beneficial effects of restricted airflow at idle has been demonstrated with the inlet throttle restrictor fully closed in previous ECI natural gas conversions. In notches 2 and 3 where the engine loading is getting higher and detonation is not a threat it is beneficial to have higher intake air temperature so that the natural gas will combust easier. Current ECI dual fuel systems do not consume natural gas in notches 1 or 2, and at notch 3 natural gas substitution is limited to 65% because the combination of very lean mixtures and low compression make it difficult to ignite the natural gas. Because of the way 2 stroke engines scavenge, it would be possible with a variable inlet guide vane system to drop the intake air pressure and flow enough that all of the burned exhaust gases were not pushed out by the incoming intake air. This is referred to as internal exhaust gas recirculation (EGR) and has several benefits when used at low loads. Because the left behind exhaust gases are much hotter than the incoming intake air, the in cylinder temperatures of the mixed intake and EGR gases will be higher. Also because the EGR gases were hotter, they would be less dense. As the cylinder pressure when the intake ports and exhaust valves are closed will be almost the same, this hotter less dense mixture will have less mass. This will make the air fuel ratio less lean. The combination of a less lean mixture that is also hotter at the start of ignition will improve the combustibility of the natural gas and will increase the amount of gas at notch 3 that can replace diesel fuel, and will also allow the substituting of some natural gas for diesel fuel at notches 2 and 1, possibly even at idle. If the system is effective enough it could eliminate the need for the coolant diverter valve used to help preheat the intake air.

This variable inlet restriction would also be a benefit to a diesel fueled EMD engine that is using a Compact SCR system, as it can drive the exhaust temperature up at idle, and notches 1 through 3 where the Compact SCR system was not functioning or was less than 30% efficient.

These increases in combustion efficiencies at low loads due to the less lean mixtures and potential internal EGR will not only reduce emissions, they will increase thermal efficiency at these low loads.

The third portion of the summary is most closely related to a sonic and dual stage gas inlet valve. What is proposed here is a gas inlet valve (GIV) that utilizes the valve head and valve seat at a narrower angle than 120 degrees on the prior art GIV to accelerate the incoming natural gas flow and direct it further away from cylinder walls.

This configuration has several advantages. First it merely requires a change in operating pressure and revised machining on two components to gain this effect.

Second, as the gas exits from an annulus instead of a hole, the gas exits as a cone formed from a sheet of gas with both an inner surface and outer surface. This surface is where the mixing happens and this design will have over twice the surface area for entraining the surrounding air.

Third, as the nozzle is formed by the movement of the poppet valve from the seat, the stoke can be adjusted to different sonic throat areas. Allowing longer valve opening times at higher pressures and lower flows.

This design completely eliminates the issue of residual unburned gaseous fuel remaining inside of a cavity in the GIV or Jet Cap after combustion.

These sonic GIV units can operate with any gaseous fuel including propane and hydrogen.

The fourth portion of this summary is most closely related to prechamber cooling sleeves. Proposed is a two piece prechamber body and nozzle design that enhances the cooling of the prechamber by incorporating a separate cooling sleeve to insure that an adequate amount of cooling fluid makes it to the bottom of the prechamber, and then evenly flows around the periphery of the prechamber to a point past the top of the inner prechamber combustion chamber wall.

The fifth portion of this summary is most closely related to an OPOC variable compression ratio mechanism While the OPOC engine being developed by ECO Motors is not an EMD 2 Stroke engine as currently used in locomotives. It does offer interesting possibilities as a power plant for genset type locomotives or as a Head End Power generator engine for passenger locomotives. The value of the OPOC's low weight and volume compared to its power output are even higher for these application when there is an effort to operate the locomotive on an alternate fuel. A typical diesel engine design converted to natural gas will need to be scaled up 30% bigger in size to make the same power.

Because of the unique nature of the OPOC engine design, it is possible to incorporate an infinitely adjustable variable compression ratio (VCR) using an outer wrist pin with an offset inner wrist pin bore.

A sliding spline fit is used to control the rotation of the outer wrist pin, because this is a two stroke engine, the piston will always be under compression when operating so that all of the VCR component slop should be taken up. The only wear items would be the parts of the sliding spline and they are replaceable without having to remove the piston.

The sixth portion of this summary is most closely related to group cylinder deactivation on prechamber ignited EMD engines. Proposed is the deactivating of groups of cylinder in the EMD engine by not firing the main GIV injector and also by interrupting the flow of fuel to the prechambers. The configuration of the EMD and its firing order make this a reasonable prospect.

In another embodiment, the simple control valve that turns on and off the supplemental fuel to the groups of prechambers could be replaced by an advanced prechamber fuel pressure control module (PPCM) which would offer other engine operating advantages. Proposed is an integrated pressure supply module using two or more PMW valves to control the prechamber pressure supply. This would be a single module that only needed a low voltage power source and the operating pressure command. It would then read the operating pressure of its own gas rail pressure sensor and control the valves. At higher flows with multiple valves, one or more of the valves could be left open full time and then one or two of the other valves manipulated in a PWM fashion. This ability to leave a valve open full time minimizes the wear on the valve and extends its service life. With multiple valves the job of operating in PWM mode can be alternated between valves to equalize valve life.

On an engine platform like a locomotive where steady state loads are common, this alternating the duty cycle of valves allows the PPCM to also check the valves against each other. This allows determining if one valve of the set is malfunctioning, and if the PPCM has an extra valve capacity it could send a warning fault code that it needs service in the future while still functioning.

When used for cylinder deactivation on an EMD engine, comparing the operation of each PPCM to each other to maintain the same prechamber rail supply pressure would be a good way to detect prechamber check valve issues. If one PPCM indicated a higher or lower duty cycle or flow, then that would indicate something was wrong in the group of prechambers belonging to that PPCM. Many issues could cause this fault, a disconnected prechamber feed line, a stuck prechamber check ball, a leaking prechamber ball and seat or a clogged prechamber body feed hole are some possibilities.

Now that prechamber fuel supply can be varied and banks of prechambers are being turned on and off with some form of cylinder deactivation, it will be beneficial to vary the prechamber fuel supply pressure when turning on the prechambers. When a bank of prechambers is turned back on, they will have cooled down from operating temperature and will have trouble firing a leaner mixture. At this point the PPCM should be commanded to operate at a slightly higher pressure temporarily so that the mixture is closer to stoichiometric and will be ignited by the spark plug easier and burn quicker. Once the prechamber is hot, the PPCM can be instructed to lower the supply pressure so the prechambers run leaner and produce less NOx.

The seventh portion of this summary is most closely related to continuous water injection for ECI converted EMD engines. If it were possible to directly inject water into an Energy Conversions Inc (ECI) converted EMD engine, it may be possible to make enough power with the stock piston compression ratio that a piston change can be avoided during conversion. This saves a significant amount of labor and cost, plus has the benefit of higher efficiency and/or lower NOx emissions.

Effective direct injection of water into an ECI converted EMD 2-stroke engine could be accomplished by injecting the water into the body of the hydraulically actuated natural Gas Inlet Valve (GIV). This will mix it with the fast moving natural gas that is then injected into the engine cylinder during the compression stroke. This allows direct injection of the water without having to create a new custom cylinder head with an additional passage for an additional injector with access to the combustion chamber. This is most applicable to engines using Low Pressure Direct Injection Systems (LPDI) where the natural gas is injected into the engine during the compression stroke at only a few hundred psi, whereas High Pressure Direct Injection (HPDI) operates its injectors at pressures above 4000 psi and would be a challenge to combine the water with the gas and also only open for a few degrees of crank rotation.

Unlike 4 stroke engines, the airflow is only at a high velocity as it goes though the liner ports. In a typical port injected engine, the water can be sprayed into the air in the inlet port which is only momentarily stationary and will then all be at a high velocity as it is inducted into the engine cylinder. In the uniflow 2 stroke airbox the airflow for the most part travels slowly up until it radially approaches the liner ports at which point it will achieve its highest velocity. This is because the air in a 4 stroke engine goes through a nearly constant cross section intake runner up to the combustion chamber, where as a uniflow 2 stroke engine has a larger plenum of intake air around the liner that only speeds up as the flow streams merge on their way to a liner port. While fumigating a 4 cycle engine intake runner can be effective, this makes fumigating the airbox area of a uniflow 2 stroke with atomized water challenging without risk of water separating out and causing puddles.

Unlike on road truck diesel engines and automobiles that attempt to operate at high loads at as low an RPM as possible. In a locomotive operating cycle the engines speed or RPM will increase as load is increased. Because the water is only needed at higher RPM, it may be possible to use a Continuous Injection System (CIS) to inject the water into the GIV. At higher RPM the GIV may spend up to 35% of its time open and flowing gas. Intuitively it would seem that pulsing of the water would be needed, but similar to early versions of port fuel injection, the water mist in the GIV could be sprayed continuously. In the case of port fuel injection, air would be flowing by the injectors less than 25% of the time and it would not be flowing fast. In the case of the 2 stroke GIV system, the GIV could be open longer and the natural gas and atomized water mixture would be flowing at sonic speed.

This eliminates the cost and complexity of having a high speed on-off water injector at each cylinder. It also reduces the needed water line size to each injector as the fluid flows continuously instead of only 25% or less of the time.

The ECI conversion system combined with CIS water injection has another water injection system benefit. Because the ECI conversion system regulated the main natural gas supply to 110 psi, and then reduces it to actual GIV operating pressure using the Gas Flow Control Valve (GFCV), it would be possible to purge the water injection system of all water after engine shutdown by taking main pressure 110 psi natural gas and purging the water injection system with it. By doing this at a higher RPM, but lower load, the GFCV will be operating the GIV's at much lower pressure and the incoming natural gas will force the water through the system after a certain amount of time. In order for this to work, the areas that need to be cleared of water need to flow downhill to the water injection nozzle at the GIV.

If this purge gas were to be fed to the water injection through a specific fixed orifice it would be possible to sense when the water lines and injector nozzles were clear of water by sensing the pressure drop in the water injection manifold. As natural gas will flow much more quickly through the water injection nozzles than the actual water would, once the system is free of water, the pressure in the water injection manifold will drop. Further by monitoring this pressure, system health and clogged nozzles can be detected. Both by the rate of manifold pressure drop and how much it dropped.

The eighth portion of this summary is most closely related to groupings and configurations of prechamber orifices for turbulent jet ignition (TJI).

In order to adequately capture the effect of TJI, the orifice has to be small enough to quench the burning air and fuel mixture as it exits the prechamber passing thought the orifices. In order to do this, orifices as small as 0.050 inch diameter may be needed. As the size of the orifice gets smaller, the prechamber jets will penetrate less distance into the combustion chamber and have a reduced effect in two ways. First the ignition will happen closer to the center of the combustion chamber reducing the effectiveness of the multiple ignition points to decrease the total burn duration.

The second negative effect of the smaller orifice jet is that there will be less accumulated partially burned air and fuel in the pockets that are formed by the small jets. These pockets of combustion radicals may end up being dilute enough or in a small enough local quantity to not ignite consistently or ignite with enough energy to initiate rapid combustion of the lean air fuel mixture around the pocket. Proposed is to have groups of a higher number of smaller nozzles configured so that two or more nozzles converge in the combustion chamber. This will help over come the penetration and concentration issues with smaller nozzles while keeping the delayed combustion benefits of the smaller nozzle quenching effects on delayed combustion for more rapid heat release rates.

In another embodiment all or some of the prechamber jets can be offset from the prechamber axis to generate swirl in the prechamber combustion chamber. With the spark plug typically on one side of the prechamber and the supplemental fuel injected on the opposite side, the mixture in the prechamber combustion chamber may remain significantly stratified if the air and fuel mixture from the main chamber is injected straight up into the chamber. In the worst case, this stratification of the charge can lead to possible misfires at certain engine loads. Charge stratification will also result in slower and inconsistent heat release in the prechamber.

In one embodiment, a prechamber assembly includes a cylinder head including a coolant cavity, a prechamber body located within the cylinder head, the prechamber body including a nozzle, and an annular sleeve radially surrounding a portion of the prechamber body. The sleeve includes a plurality of coolant inlet holes. A portion of the prechamber body is radially spaced from the sleeve to form a coolant sleeve annulus extending along a length of the prechamber body above the coolant inlet holes. The coolant cavity and the coolant sleeve annulus are in fluid communication through the plurality of coolant inlet holes.

In a further embodiment, the sleeve further includes a plurality of coolant outlet holes, and the plurality of coolant inlet holes is positioned towards the end of the coolant sleeve annulus closest to the nozzle. In another embodiment, the coolant outlet holes are in fluid communication with a coolant return cavity. In other embodiments, the prechamber assembly includes a coolant comprising water.

In another embodiment, the prechamber body includes a feed groove distal from the nozzle and in fluid communication with the cooling cavity, and the coolant cavity spans from the feed groove to the plurality of coolant inlet holes. In a still further embodiment, the prechamber assembly further includes a coolant comprising engine oil. In some embodiments, the sleeve and the nozzle are integral.

In a further embodiment, a prechamber assembly includes a cylinder head including a coolant cavity and a prechamber body located within the cylinder head. The prechamber body comprises a nozzle that includes a plurality of jets directing flow through the nozzle at an angle other than parallel or perpendicular relative to a longitudinal centerline axis of the nozzle. The plurality of jets are clustered in groups radially spaced apart from each other around the longitudinal centerline axis of the nozzle. In some embodiments, the groups of jets are equally spaced radially. In other embodiments, flow through the jets of each group of jets converges at a distance from the nozzle. In a still further embodiment, each group of jets comprises two jets. In another embodiment, the nozzle further includes a centerline jet aligned along the centerline axis. In further embodiments, the nozzle further includes a centerline group of jets aligned approximately parallel to the centerline axis, wherein flow through the centerline group of jets converges at a distance from the nozzle.

In a still further embodiment, a prechamber assembly includes a cylinder head including a coolant cavity; and a prechamber body located within the cylinder head, the prechamber body including a nozzle. The nozzle includes a plurality of jets, each jet aligned along a respective axis that is offset from a centerline axis of the nozzle such that the jet axes do not intersect the centerline axis. In some embodiments, the nozzle includes a mixing area, and wherein each jet axis of the plurality of jets is offset an equal distance from the centerline axis such that flow through the plurality of jets causes a rotating flow about the centerline axis in the mixing area of the nozzle.

DESCRIPTION OF THE DRAWINGS

FIG. 7 is an isometric view of an ECI manufactured gas inlet valve (GIV).

FIG. 10B is a cross section view illustrating a dual stage hydraulic valve assembly in the fully open state.

FIG. 10C is a cross section view illustrating a dual stage hydraulic valve assembly in the partially open state.

FIG. 12A is an enlarged view of the prechamber body of the EMD cylinder head of FIG. 11.

FIG. 12B is an enlarged, fragmentary view of the prechamber body of FIG. 12A.

FIG. 13A is a Section View of a truck engine cylinder head with a prechamber assembly installed.

FIG. 15A is a table illustrating the firing order variations for a 12 cylinder EMD 2-stroke engine.

FIG. 15B is a table illustrating the firing order variations for a 16 cylinder EMD 2-stroke engine.

FIGS. 17-22C illustrate additional views of nozzles including TJI jets.

DETAILED DESCRIPTION

To facilitate an understanding of the present disclosure, a number of terms and phrases are defined below:

Gaseous Fuel: The predominant gaseous fuel used in internal combustion engines is natural gas consisting mostly of methane, but with minor modifications these engines could consume any gaseous fuel including but not limited to propane, natural gas and hydrogen. In this document the term natural gas and gaseous fuel are used interchangeably.

Hydrocarbon (HC): Emissions resulting from incomplete combustion.

Main Charge: The air fuel mixture in the main combustion chamber space between the piston top and the cylinder head. If an opposed piston engine, this would be the space between the opposed piston faces.

Particulate Matter (PM): Particulate matter is a criteria pollution emitted from many sources. In this document we will commonly refer to it simply as PM. It could include both diesel soot PM that is considered toxic in California or the type of PM created by the consumption and combustion of lube oil from an engine. While still considered PM as a criteria emission, the PM from lube oil consumption is considered less toxic than diesel soot.

Figure 1:
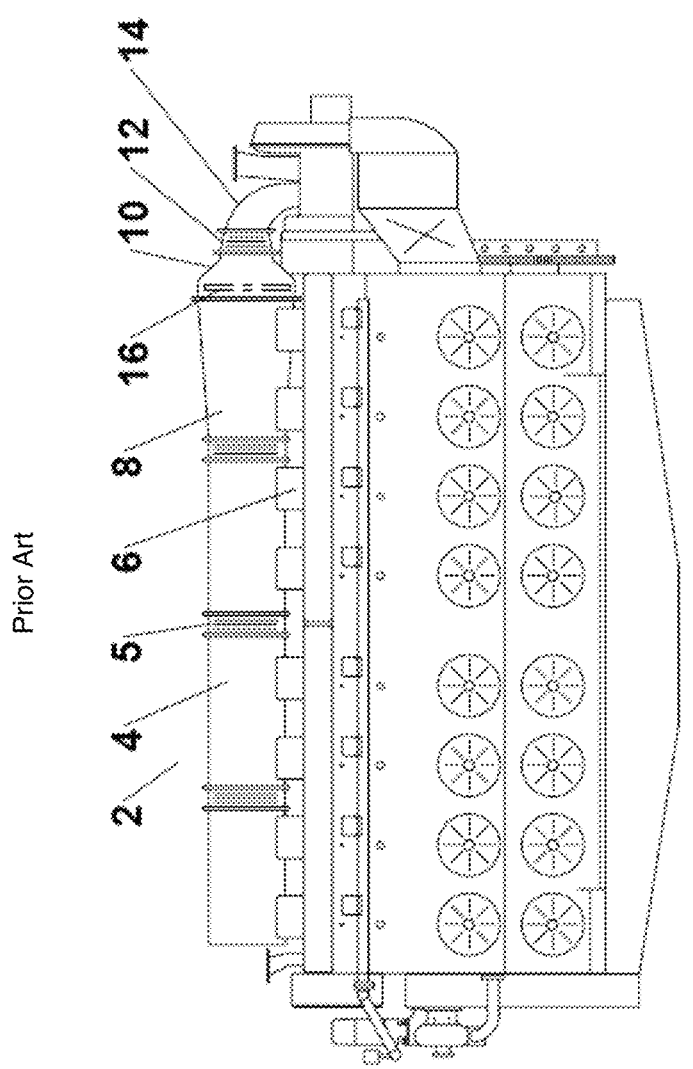
FIG. 1 is a side view of a typical 16 cylinder EMD turbocharged engine as used in locomotives.

The first portion of the detailed description is most closely related to a single element preturbine oxidation catalyst element for EMD turbocharged engines using twisted exhaust runners. FIG. 1 is a side view of a typical 16 cylinder EMD turbocharged engine as used in locomotive and marine applications. In this prior art configuration Engine 2 has an exhaust system along the top of it. The exhaust system is composed of three exhaust collector segments 4 and one turbocharger adapter exhaust collector segment 8 that collect the exhaust gases from the 16 engine cylinders into one combined exhaust mass flow. Each one of these exhaust collector segments connects to 4 of the engines 16 cylinders, with exhaust gases flowing from an individual engine cylinder to an exhaust collector segment through an exhaust runner 6. The standard exhaust runner 6 is a 4 inch by 9 inch rectangular tube as illustrated in FIG. 2A. The longer 9 inch dimension is shown along FIG. 1 as going left to right and the four inch dimension is normal to FIG. 1. The exhaust gasses flow in a direction from the bottom of the Figure through an exhaust runner 6 up into an exhaust collector segment. Each exhaust collector segment has two pairs of exhaust runners 6, only one is visible as the second exhaust runner 6 of each pair is directly behind the first exhaust runner 6. In some version of the EMD engines, the pairs of exhaust runners 6 are combined together into one larger runner. Sometimes this larger runner would have a shared wall in between, keeping the exhaust gases from the two cylinders separate until they mixed with the combined exhaust flow in the exhaust collector segments. In other cases this was missing or removed and the exhaust gases from the pair of engine cylinders would mix in the combined exhaust runner 6 volume before mixing with the combined exhaust flow in the exhaust collector segments. This would appear the same in FIG. 1 and functionally does not affect this description of the prior art.

The three exhaust collector segments 4 and one turbocharger adapter exhaust collector segment 8 are connected to each other by flexible bellows 5 at three places. The now combined exhaust gasses flow from the turbocharger adapter exhaust collector segment 8 thru debris screen housing 10 and small flexible bellows 12 into the turbocharger inlet 14. As the combined exhaust mass flows through the debris screen housing 10, it must pass through debris screen 16. Debris screen 16 is a metal plate installed in debris screen housing 10 with a large number of small holes that will allow the exhaust gases to flow through it, but will block any small solid parts from traveling with the exhaust gases into the turbocharger and damaging the turbine blades. This debris screen 16 does cause a small pressure drop in the exhaust system which reduces engine performance and efficiency, but it prevents damage to the turbocharger assembly in the case of a component failure elsewhere in the engine. This is a valuable trade off as the turbocharger is one of the most expensive parts of the engine.

Figure 2:
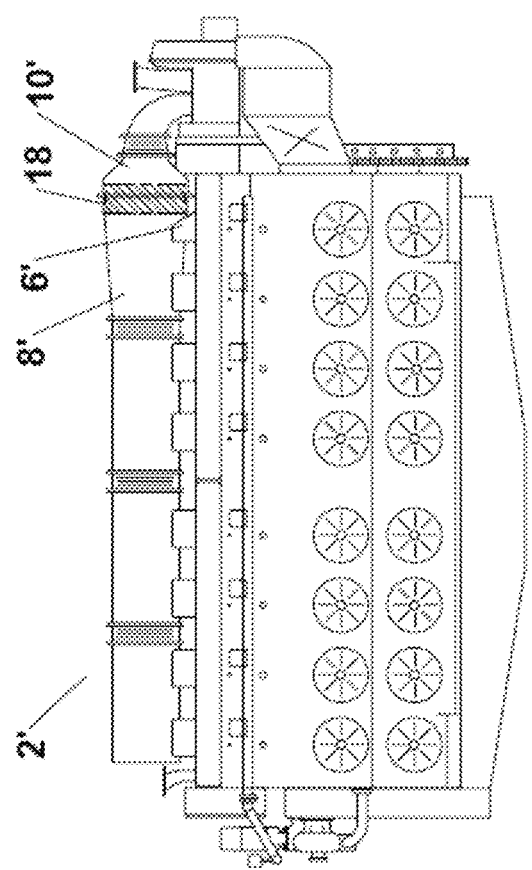
FIG. 2 is a side view of the same engine in FIG. 1 except that the exhaust system has been revised to accommodate a single substrate OC system.
Figure 2A:
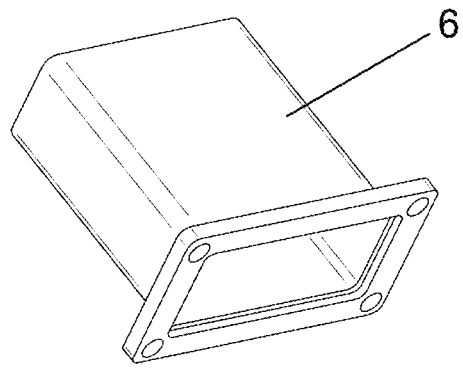
FIG. 2A is an isometric view of a prior art exhaust runner.

FIG. 2 is a side view of the same engine in FIG. 1 with a revised exhaust system to include a single substrate OC system. Engine 2' has similar components in its exhaust system upstream of turbocharger adapter exhaust collector segment 8' and downstream of debris screen housing 10'. The primary difference is the deletion of the debris screen 16 and the addition of the OC substrate 18 into modified turbocharger adapter exhaust collector segment 8'.

Figure 2B:
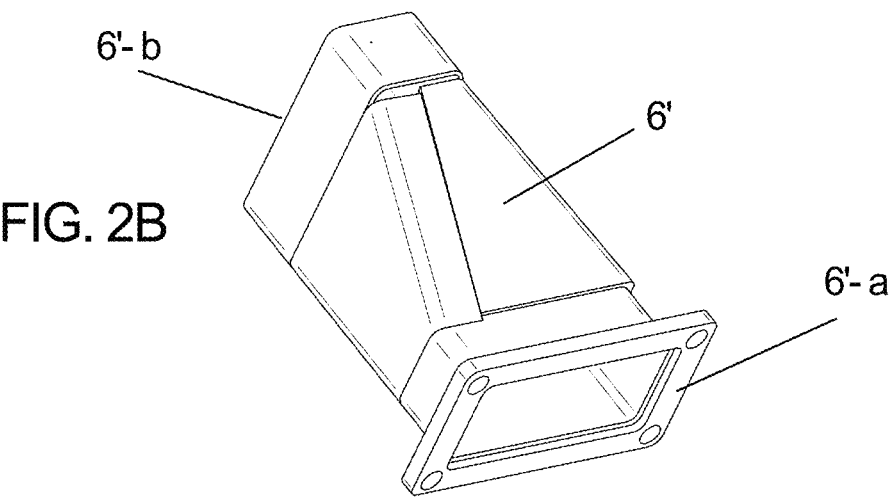
FIG. 2B is an isometric view of an embodiment of an exhaust runner of the engine of FIG. 2.
Figure 2C:
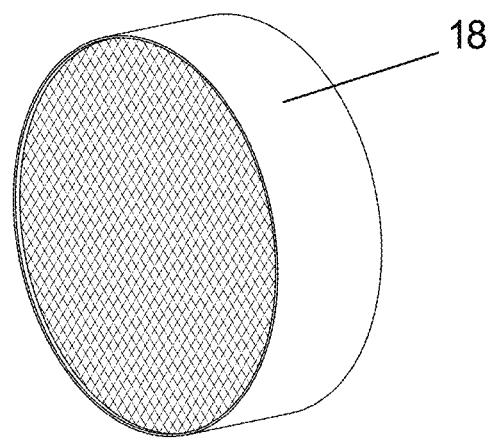
FIG. 2C is an isometric view of an embodiment of an OC substrate of the engine of FIG. 2.

Turbocharger adapter exhaust collector segment 8' has been modified to allow the OC substrate 18 as shown in FIG. 2C to slide into it. The primary modification to make this possible is the reshaping of exhaust runner 6'. Where exhaust runner 6 had a consistent 9 inch by 4 inch rectangular shape along its path as shown in FIG. 2A, the cross section of exhaust runner 6' will change along its length as shown in FIG. 2B. It will start with the same 9 inch by 4 inch shape at the engine cylinder port, but as it travels towards the turbocharger adapter exhaust collector segment 8' its shape will transform as depicted in FIGS. 2 and 2C. The goal is to have a similar cross section area along the exhaust flow path of exhaust runner 6', but have the length and width dimension transition from 9 inches by 4 inches at a runner first end 6'-$a$ to something close to 4 inches by 9 inches at a runner second end 6'-$b$. This will allow the creation of a cylindrical pocket that allows OC substrate 18 to slide in. The pocket does not need to be cylindrical, but the changing cross section of the exhaust runners 6' is what allows a single OC substrate 18 to fit between the exhaust runner 6' and the small flexible bellows 12.

Referring to FIG. 2C, the OC substrate 18 is likely to be a round metallic substrate approximately 18" in diameter and 5" thick. These sizes and substrate material composition will vary depending on system design. OC substrate 18 may slide all the way into either turbocharger adapter exhaust collector segment 8' or into debris screen housing 10', but is most likely to protrude partially into each. Other shapes of substrate and pockets to fit it in may not be cylindrical, but may be oval or rectangular.

In this embodiment it is designed that the OC substrate 18 slides into a pocket created in turbocharger adapter exhaust collector segment 8' and is retained in that pocket by debris screen housing 10'. In another embodiment, turbocharger adapter exhaust collector segment 8' and debris screen housing 10' may be combined into one assembly with OC substrate 18 sliding into this assembly from direction normal or close to normal to the axis of exhaust gas flow. This would require some kind of cover plate to be used to cover the pocket opening similar to the cover plates used in the Miratech V-Cat design.

Figure 3:
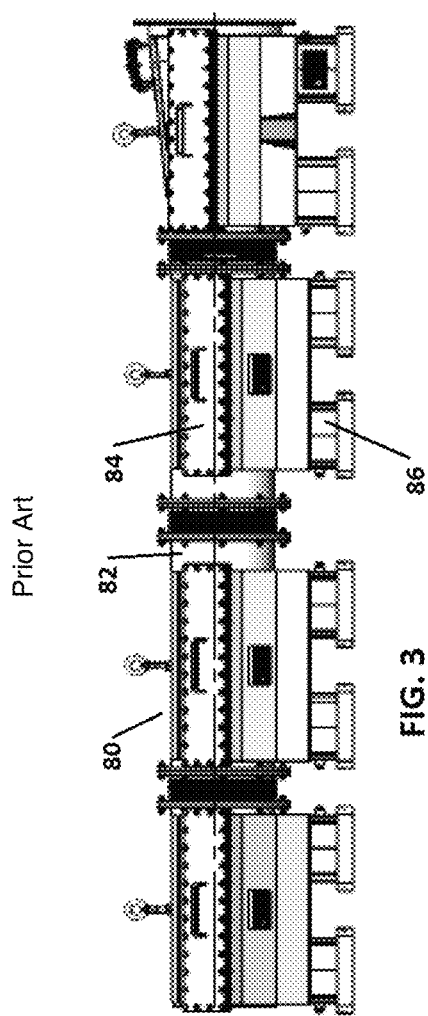
FIG. 3 is a side view of the prior art Miratech preturbine V-Cat system.

FIG. 3 is a side view of the prior art V-Cat system 80 patented and manufactured by Miratech. The V-Cat system 80 comprises four exhaust collector segments 82 which replace the three exhaust collector segments 4 and one turbocharger adapter exhaust collector segment 8 from FIG. 1. In each exhaust collector segment 82 are four individual OC substrates to service the exhaust gases of four engine cylinders. A pair of OC substrates is captured on each side of a exhaust collector segment 82 by a cover 84. Each exhaust collector segment 82 has four exhaust runners 86 similar to the exhaust runners 6 in FIG. 8 and FIG. 9.

It is a cover similar to cover 84 that could be used to retain a single OC substrate 18 into a combined turbocharger adapter exhaust collector segment 8' and debris screen housing 10'.

The second portion of the detailed description is most closely related to adjustable inlet guide vanes for improved emissions in EMD locomotives.

Figure 4:
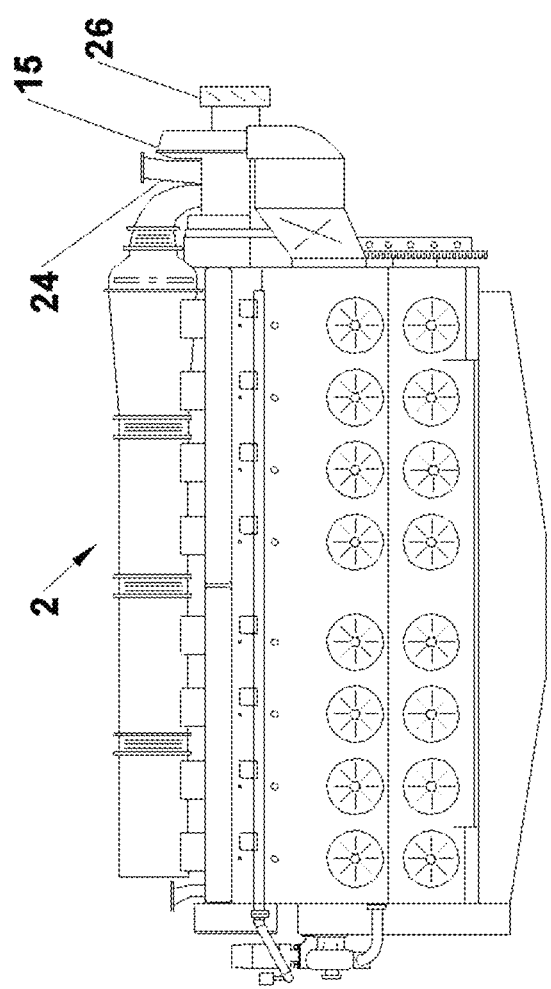
FIG. 4 is a side view of an EMD 16 cylinder illustrating the location of the Variable Inlet Guide Vane Unit.

FIG. 4 is a side view of a 16 cylinder EMD engine 2. Turbocharger 15 is mounted to engine 2. Variable inlet guide vane unit 6 is mounted to the compressor inlet of turbocharger 4. Even with as much value and performance that the variable inlet guide vane units adds, FIG. 4 illustrates what a small and easy to package system the variable inlet guide vane unit is. No parts on the engine need to be replaced, only the intake pipe bringing in outside air to the turbocharger compressor inlet. On the other hand this unit may allow the simplification and cost reduction of the ECI conversion kit by eliminating the waste gate assembly the aftercooler diverter valve and its extra plumbing.

Figure 5:
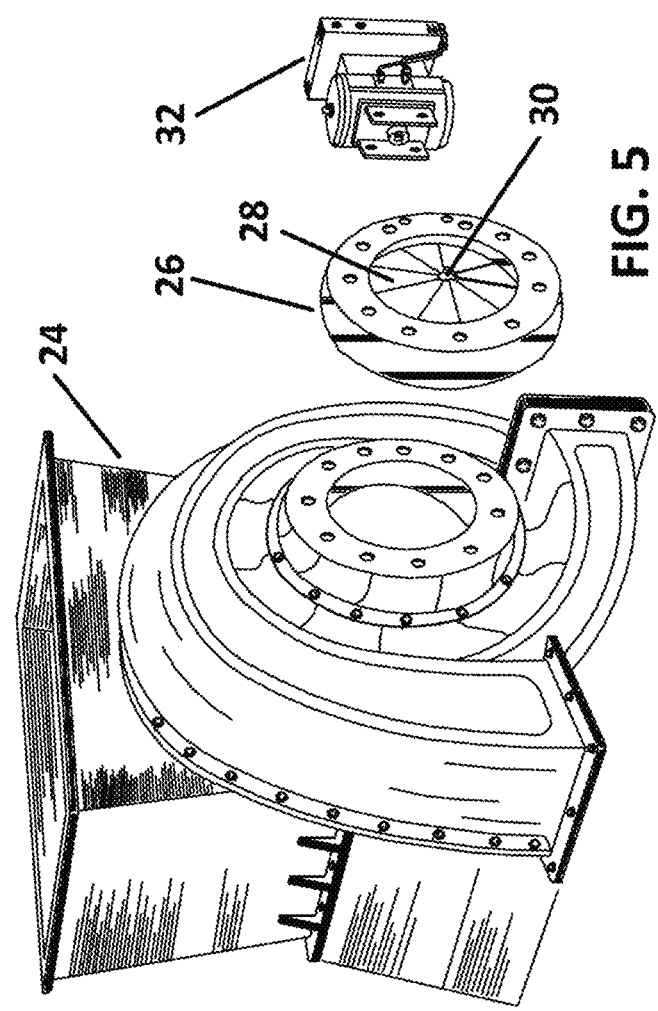
FIG. 5 is an isometric view of the turbocharger and the Variable Inlet Guide Vane Unit with its blades closed.

FIG. 5 is an isometric view of the engine turbocharger 24 and the variable inlet guide vane unit 26. In this view the guide vanes 28 are in the fully closed position, this leaves a small flow area 30 formed by the blade tips. In the prior art version of this device the valve was either fully open or fully closed, manipulation of this state was done by actuator 32.

New embodiments of this system will have actuator 32 upgraded to have variable positions. In one embodiment a 90 degree variable position actuator may be used and the fully closed position will not have the guide vanes 28 rotated so far that they touch. This now allows the vanes when rotated 90 to have traveled past neutral and be positioned at an angle to cause increased boost at notch 6 or act as a waste gate limiting turbine rpm at notch 8.

A further embodiment will have an actuator like the Delphi Smart Remote Actuator that has 120 degrees of travel. With this variable actuator, the guide vanes 28 can be rotated fully closed and still have the range to rotate 30 degrees past neutral well into the range where notch 6 boost is increased.

Figure 6:
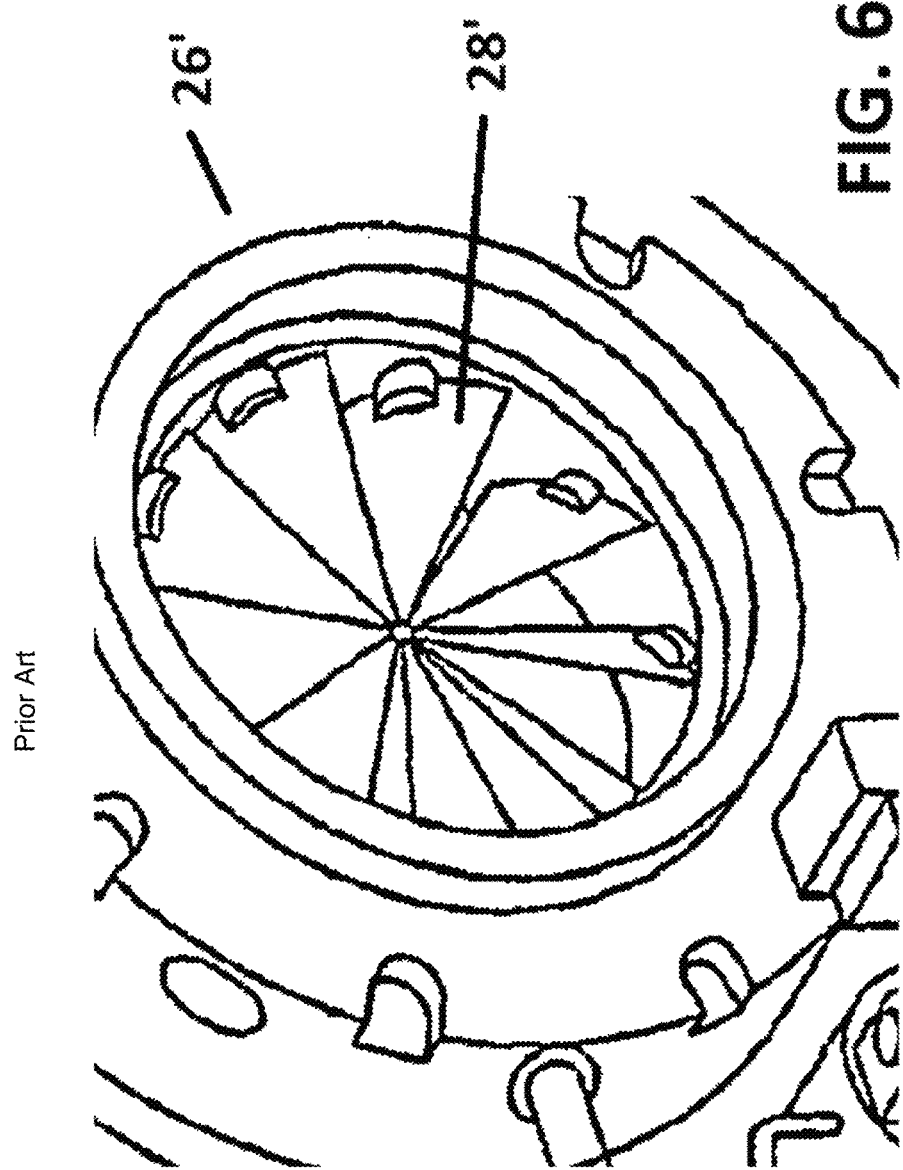
FIG. 6 is an isometric view of a prior art Variable Inlet Guide Vane Unit with the blades partially open.

FIG. 6 is an isometric view of a prior art inlet guide vane unit 26' with the guide vanes 28' partially open.

The third portion of the detailed description is most closely related to a sonic and dual stage gas inlet valve that could also be used for continuous water injection.

FIG. 7 is an isometric view of a standard ECI GIV assembly 40. It illustrates the relationship between the GIV body 41 the valve seat insert 42 and the poppet valve 43. In this view the poppet valve is in the fully extended position. This particular valve assembly is designed to inject natural gas into and EMD 2 Stroke natural gas engine on the compression stroke. It is possible to use this direct injection valve design and any embodiment of the current invention in any reciprocating engine using any gaseous fuel. This GIV could also be used for direct and continuous water injection. Gaseous fuel is supplied to the GIV at natural gas inlet 46, secondary inlet 47 is where a supplemental water injector could be located. The mixed gaseous fuel and water mist could then exit the GIV into the combustion chamber at natural gas exit 48

Figure 8:
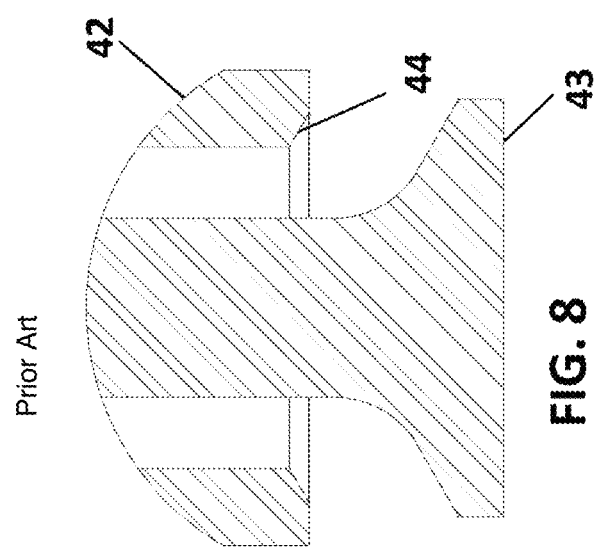
FIG. 8 is cross section view of a conventional poppet valve in the open position of a prior art GIV.

FIG. 8 is a cross section view of the prior art GIV assembly 40 from FIG. 7. FIG. 8 illustrates the poppet valve 43 and valve seat insert 42 when the poppet valve is fully extended. This valve is typical in construction to the exhaust and intake valves in most reciprocating piston engines. The valve seat area 44 is around 0.065" wide and the valve seat angle is 60 degrees from the valve axis. The intent of this valve system is specifically to allow the most airflow to pass through it with the minimal amount of pressure drop during the time is has available to be open. There is minimal consideration as to what the characteristics the exiting airflow has and the pressure drop across these valves is typically under 2:1 for conventional engine intake and exhaust valves and up to 4:1 for the GIV units used on turbocharged EMD engines with a natural gas feed pressure of 80 psi.

Figure 9:
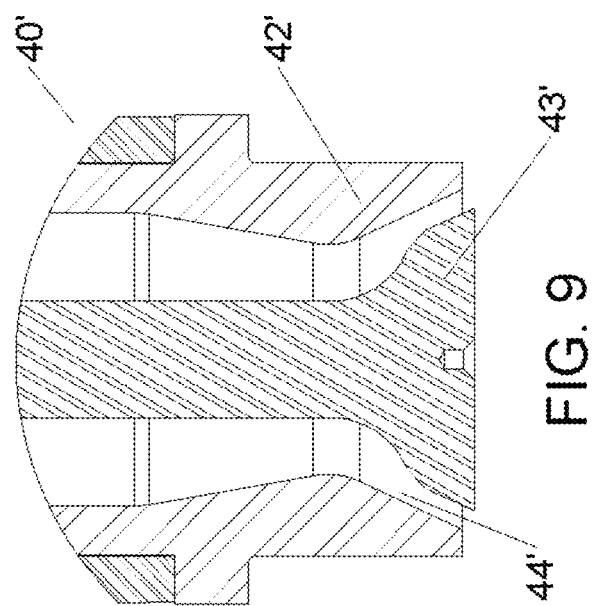
FIG. 9 is a cross section view of the revised poppet valve and valve seat insert to achieve sonic gas injection flow.

FIG. 9 is a cross section of the new poppet valve 43' and valve seat insert 42' design. Just the modification of these two parts converts ECI's standard GIV into a version that creates a sonic cone of injected gaseous fuel. The view on the left shows the valve in the closed position. Significantly different from FIG. 8 is that the flow cone angle is 50 degrees instead of 120. The valve seat angle is actually 25 degrees from the axis of poppet valve 43' instead of 60 degrees in the prior art design. The cone angle could be more or less than and 50 degrees. The narrower this angle is, the further into the cylinder bore that the gaseous fuel travels before it impinges on the cylinder wall for improved mixing.

Figure 10A:
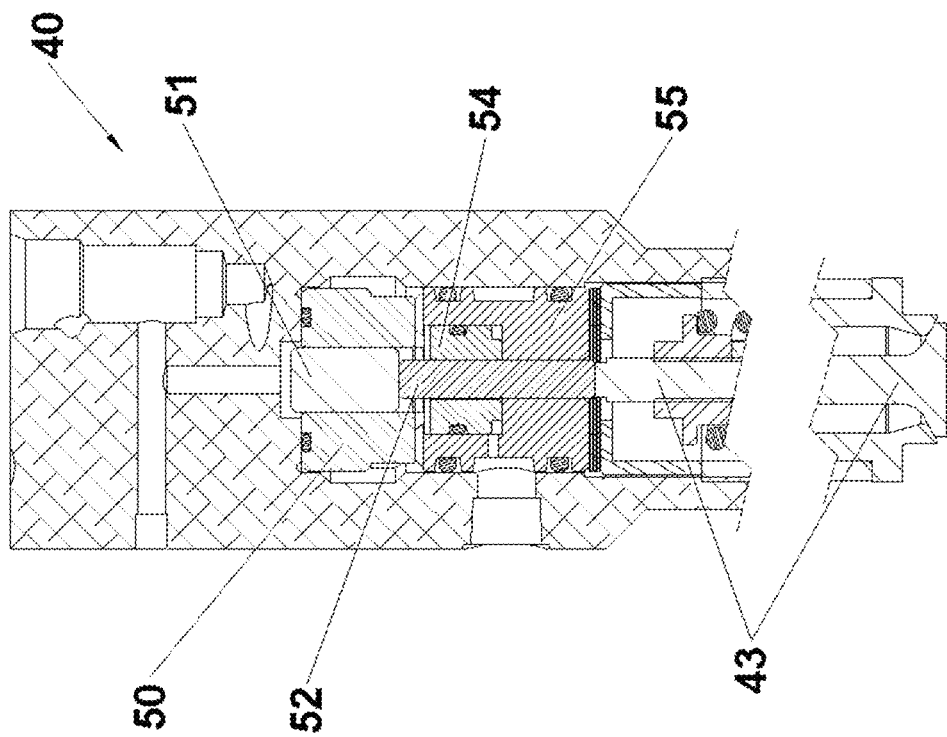
FIG. 10A is a cross section view illustrating a dual stage hydraulic valve assembly in the closed state.

FIG. 10A is a cross section view of a hydraulic actuator for the GIV assembly 40 with two discrete open positions. This view illustrates the GIV assembly 40 in the closed position. In this view the plunger 51 is inside of the plunger body 50, and it is the plunger 51 that the hydraulic fluid pushes down on to open up the poppet valve 43. These two parts are consistent with the standard prior art version of GIV assembly 40. What is added in this embodiment is the plunger follower 52, the plunger stop body 55 and the movable plunger stop 54.

FIG. 10B the GIV assembly 40 is in the full open position. The plunger 51 was forced down by the hydraulic fluid until it contacted the movable plunger stop 54. The movable plunger stop 54 is resting on the top surface of the plunger stop body 55. When the plunger 51 started to move in the downward direction, it contacted, pushed down on and moved the plunger follower 52. The plunger follower 52 was in contact with the top of the poppet valve 43 and pushed it down also. All three parts continued to move downward until the plunger motion 51 was stopped as it contacted the movable plunger stop 54.

FIG. 10C illustrates the GIV assembly 40 in the partially open position. To stop the poppet valve 43 in this position, pressurized hydraulic fluid is fed into the plunger stop hydraulic port 53. This pressurizes the plunger stop hydraulic cavity 57 and this pressure forces the movable plunger stop 54 to move up until it contacts the bottom of the plunger body 50. With the movable plunger stop 54 in this position, the plunger 51 now travels a shorter distance before contacting the movable plunger stop 54 which will now limit the poppet valve 43 opening to a reduced stroke in the partially open position. The movable plunger stop 54 is able to keep the plunger 51 from moving it down because it has more surface area exposed to the hydraulic fluid pressure in the plunger stop hydraulic cavity 57.

This system could be designed to have more than one movable stop by multiplying certain features in this design.

The standard way to operate an ECI low pressure direct injection EMD conversion is to have the valves stay open for set amount of time for each piston stroke. This time period is set by the amount of time available at high RPM to inject gas after the intake ports are closed. After this time period is set, the engine load is controlled by adjusting the gas supply pressure to the injectors. As the load and RPM decreases and less fuel is required, the supply pressure is decreased. It would be possible to maintain a constant pressure and then reduce the injection time as fuel demand decreased, but that may decrease the amount of air and fuel mixing because the high velocity fuel gas was injected for a shorter period of time.

On a fuel system using standard poppet valves that achieve sonic flow at the valve periphery this would be a measurable effect.

This is the primary advantage of the GIV with multiple valve stroke settings. It reduces the total amount of injector feed pressure, instead of reducing the pressure for all 8 throttle notches in a locomotive. The pressure could be reduced incrementally for Notches 7 and 6, and then Notch 5 will have the GIV assembly 40 operate at reduced poppet valve 43 lift and a slightly longer valve open time because the RPM is now lower. From this point both the valve open time and gas supply pressure will be reduced incrementally down to the minimum flow needed at idle. The goal is to have the GIV fuel gas feed pressure remain high enough that good mixing is maintained, but balance that with manipulation of the valve open time to maximize the amount of time the high velocity injected gas is mixing with the air in the combustion chamber.

As an example, instead of having a constant 80 milliseconds of injection time starting at a pressure of 300 and dropping to 100 at notch 1, now the highest 3 throttle notches will have an 80 ms injection time and pressure will drop to 250 in notch 6. At throttle notch 5 the injection time is raised to 115 ms, the poppet valve 43 lift is 40% of full open and the injector feed pressure is raised back to 300. By notch 3 the injection time has be lowered back to 80 ms and pressure feed pressure has only been reduce down to 275. By throttle notch 1, the pressure has been further reduced to 220. By ending at a 220 psi supply pressure instead of 100 psi, the exit velocity of the gas leaving the GIV should still be sonic. If it had dropped down to 100 psi, it would likely have become subsonic in the GIV.

An interesting further use of this concept would be in large ship engines. Both 2 stroke and 4 stroke engines that are diesel pilot ignited would benefit from added swirl in the combustion chamber. Any number of these GIV's could be placed offset from the engine cylinder axis and tilted at an angle to induce a swirl to the air in the combustion chamber. If more than one supersonic GIV is used, they should have a similar angle in reference to the engine cylinder axis so that they induce swirl in the same direction. This swirl of air around the engine cylinder axis in the combustion chamber improves the combustion of the diesel pilot helping to lower PM or NOx emissions. This is because the swirl improves the air utilization during mixing controlled combustion as the surface of the diesel fuel jet is in contact with more air molecules than it would be if the air was stationary.

Another interesting possibility will be the incorporation of sonic flow GIV's with an opposed piston engine. If only one sonic GIV was used per cylinder there would be the risk of the gas flow impinging on the opposite cylinder wall. This may or may not have detrimental effects such as a colder spot at the cylinder wall with possible lubrication or thermal stress issues. If cylinder wall impingement is to be avoided or for improved mixing, two of these sonic GIV's could be placed directly opposite of each other across the combustion chamber, in this case the two cone shape flows would collide in the middle of the chamber causing a great amount of turbulence and entraining significantly more intake air in the cylinder before the cold gases reach the cylinder walls.

The fourth portion of this detailed description is most closely related to prechamber cooling sleeves including single and double pass variations.

Figure 11:
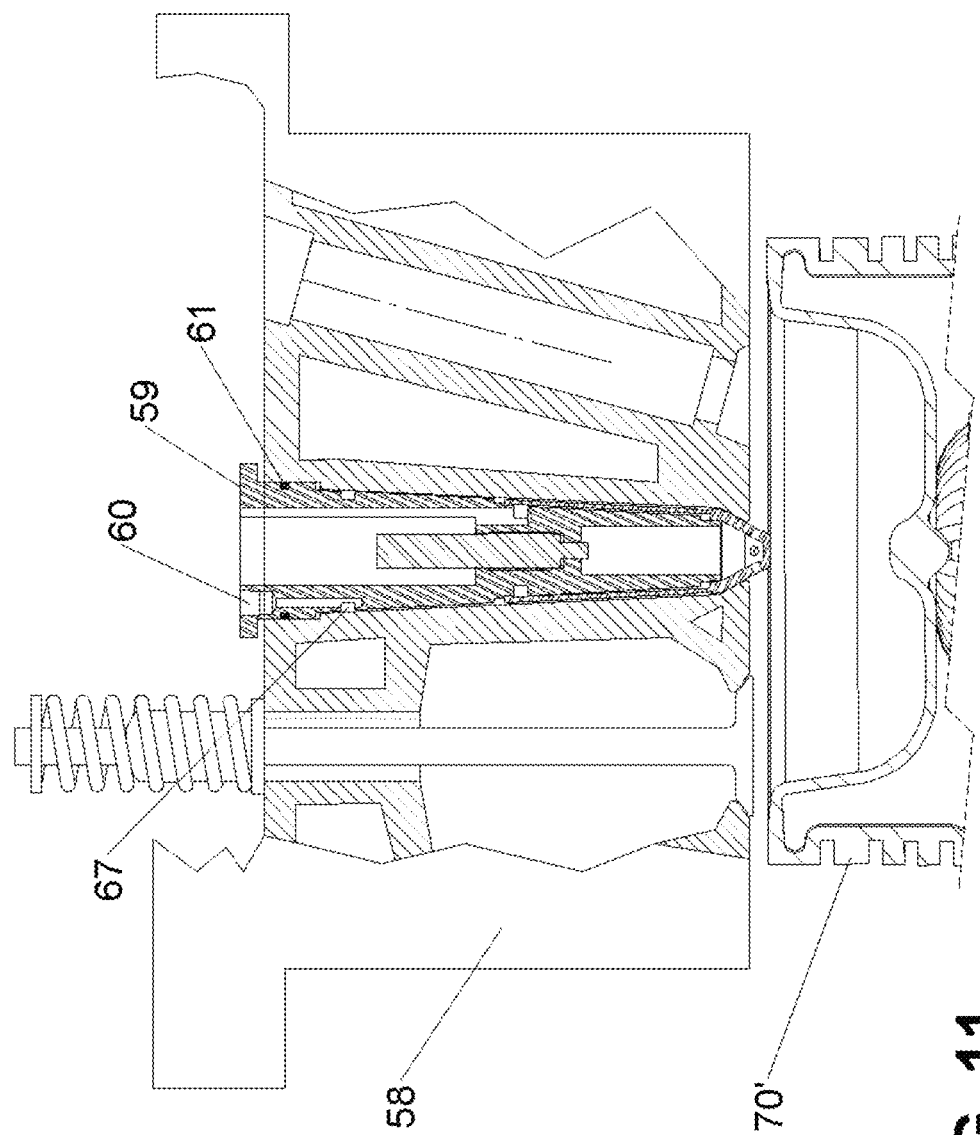
FIG. 11 is a cross section view of an EMD cylinder head with a prechamber installed.

FIG. 11 is a cross section of a cylinder head 58 illustrating the placement of the prechamber 59 in relation to the cylinder head 58 and the piston 70'. The o-ring 61 at the top creates a cavity between the prechamber 59 outer surface and the cylinder head 58 pocket wall, this cavity is sealed at the bottom where the lower tapered section of the prechamber 59 is forced against the bottom of the cylinder head 58 pocket. This seal at the bottom is designed to resisted blow by of combustion gasses when the engine is operating so it will not have an issue keeping the prechamber coolant out of the engine cylinder.

At the top of the prechamber 59 is the cooling fluid inlet 60. Pressurized Cooling fluid is injected here and an internal passage brings the cooling fluid to an exit port on the outer surface of the prechamber below the o-ring 61. The prechamber cooling fluid can be many different fluids including water, but in this preferred embodiment it would be engine oil to eliminate the need for return plumbing to a separate cooling fluid reservoir.

In this embodiment, the cooling fluid is injected into a feed groove 67 around the prechamber 59. This feed groove 67 acts as a manifold and helps distribute the cooling fluid around the entire circumference of the prechamber body 59 before it starts to flow through the narrow cavity between the prechamber body 59 and cylinder head 58 wall. This is considered the first pass of the coolant in a double pass prechamber cooling system.

In this prechamber embodiment is a diesel injector, this prechamber configuration uses a micropilot of diesel fuel to start ignition. This invention would work in a similar fashion with a spark plug ignited prechamber with or without additional fuel being added to the prechamber 59.

Another embodiment not depicted could replace the single feed groove 67 around the prechamber body 59 with a spiral groove. The upper portion of the prechamber body 59 has a thicker wall section and in this area of the prechamber body a spiral groove could be cut into the outer surface of the prechamber. Possibly 10 to 15 turns, it would appear similar to an acme square thread except the eternal thread feature would be thin compared to the size of the passage. This spiral passage would slow the cooling fluid down allowing it more time to absorb heat from the prechamber body. The spiral groove feature could also give the cooling fluid more than twice the surface area to transfer heat.

FIG. 12A is a close up cross section of the lower half of the prechamber body 59. FIG. 12B is a detail view of FIG. 12A. Clearly visible is the prechamber nozzle 68 that slides over the prechamber body 59 from the bottom. The prechamber nozzle 68 is designed to contact the prechamber body 59 at two points with press fit pilots. There is a press fit pilot at the top of the prechamber nozzle 68; this pilot is in a low stress area and only seals against the cooling fluid going from the coolant first pass straight to the coolant collection groove. This is also the area that the prechamber nozzle 68 and the prechamber body 59 could be optionally welded together.

If the prechamber body 59 upper half was equipped with an optional spiral coolant groove it would end before the optional weld area.

The second contact point between the prechamber nozzle 68 and the prechamber body 59 is the press fit at the bottom of the prechamber nozzle 68. This press fit is important as it seals the prechamber combustion area from the coolant cavity around the prechamber 59. The thermal expansion stress from the prechamber body 59 heating up and the forces of combustion both enhance the sealing capacity.

With or without the optional spiral cooling groove, the coolant first pass 64 starts at the point the cooling fluid is first injected at feed groove 67 on the exterior of the prechamber 59 and continues down the length of the outer surface of both the prechamber body 59 and prechamber nozzle 68. As the cooling fluid moves along the coolant first pass 64, it will be simultaneously absorbing heat from the prechamber 59 and prechamber nozzle 68 and transferring that excess heat to the cylinder head 58 surface.

Just before the contact point where the prechamber nozzle 68 seals to the cylinder head 58, there is a ring of radial coolant inlet holes 66. These radial coolant inlet holes 66 are at the end of the coolant first pass 64 and the start of the cooling sleeve annulus 65. These radial coolant inlet holes 66 are equally spaced small holes around the prechamber nozzle 68 and the pressure drop that the cooling fluid experiences as it transitions these radial coolant inlet holes 66 equalizes the flow around the perimeter of the prechamber nozzle 68. This encourages the flow before and after the radial coolant inlet holes 66 to be more evenly distributed even if the thickness of the first and second coolant passes may vary slightly due to machining tolerances of the prechamber 59 or the head 58.

Once the cooling fluid enters the cooling sleeve annulus 65, it will flow upwards around the outside of the prechamber 59 and the inside surface of the prechamber nozzle 68. This cooling fluid ends up collecting in coolant return groove 62 and exiting prechamber 59 through coolant exit port 63. This cavity for cooling sleeve annulus 65 should be thinner than that of coolant first pass 64 so that the cooling fluid travels faster and picks up less heat. The goal is to absorb only the amount of heat required out of the prechamber 59 body, but not so much that it can over heat the cooling fluid or over cool the prechamber body. When the coolant fluid is oil, overheating will result in the oil coking in this area and the corresponding overheating and failure of the prechamber due to lack of cooling fluid. A slower velocity along the outside of the prechamber nozzle 68 in the coolant first pass 64 will allow the cooling fluid to absorb more heat from the prechamber nozzle 68 and transfer it to the cylinder head 59 wall.

There are three general goals of prechamber cooling; keeping the spark plug from overheating, keeping the prechamber nozzle 68 from getting hot enough to cause pre-ignition, while keeping the prechamber 59 inner combustion chamber walls hot enough to insure easy and rapid combustion internally.

The coolant first pass around the top of the prechamber 59 is the area that will control spark plug temperature. The optional spiral cooling groove could enhance that cooling if needed. Prechamber nozzle 68 will get cooling from both coolant passes and will transfer some heat to the cylinder head 58 at its contact point. The heat transfer between contacting metal surfaces can be an order of magnitude less than the heat transfer through conduction of the base metal. Although the prechamber nozzle 68 to cylinder head contact 58 point is a cooling path, it is likely that significantly more heat from the nozzle is conducted up through the nozzle and absorbed by the cooling fluid that passes by two surfaces on the nozzle. The prechamber 59 wall around the prechamber combustion chamber is left as thick as possible to reduce the heat conduction rate and it is only cooled by a single pass of the cooling fluid.

By the time the coolant has gotten to the end of the second pass in a double pass cooling sleeve, it may have gotten too hot to be effective. This will cause the lower part of the prechamber to be cooled more effectively and the cooling fluid could actually be over heated by the time it reaches the end of the cooling sleeve annulus 65.

In another embodiment a second set second radial inlet coolant holes 65 would function as bypass coolant holes that could allow some coolant to bypass the bottom of the prechamber body and start further up the coolant sleeve annulus 65. These holes would allow some coolant to travel an abbreviated distance through the coolant sleeve annulus 65 of the nozzle 68, therefor increasing the total amount of coolant fluid mass and decreasing the average temperature of the coolant that is used in last sections of the cooling sleeve annulus 65 of the double pass system. This also would slightly raise the temperature of the material at the start of the second pass as there would be less coolant going by.

In another embodiment, the addition bypass coolant holes can be at multiple axial distances from the first radial cooling inlet holes 66 for even more even distribution of coolant temperature along the cooling sleeve annulus.

Although nozzle 68 in this embodiment is pictured with an integrated cooling sleeve, alternate embodiments could have the cooling sleeve manufactured as a separate part from nozzle 68 with minimal change in the performance of the prechamber cooling system.

FIG. 13A is a preferred embodiment of a prechamber 59' for installation into a Detroit Diesel Series 60 diesel truck cylinder head 58' instead of an EMD locomotive engine. In cylinder head 58' there is a coolant cavity 92 that contains jacket water coolant for cooling the cylinder head. Typically this coolant will be a mixture of glycol and water. There are also two fuel return cavities 91 that would have been used to supply and return fuel for the diesel fuel injectors. In this embodiment those diesel injectors have been replaced by prechamber 59'. In this embodiment, it will be jacket water coolant instead of oil that will be used to cool the prechambers, and this coolant will have to be captured and returned to the engine cooling system. In this embodiment fuel return cavities 91 are used for the collection and transfer of prechamber cooling fluid out of the engine back to the jacket water cooling radiator system.

Figure 13B:
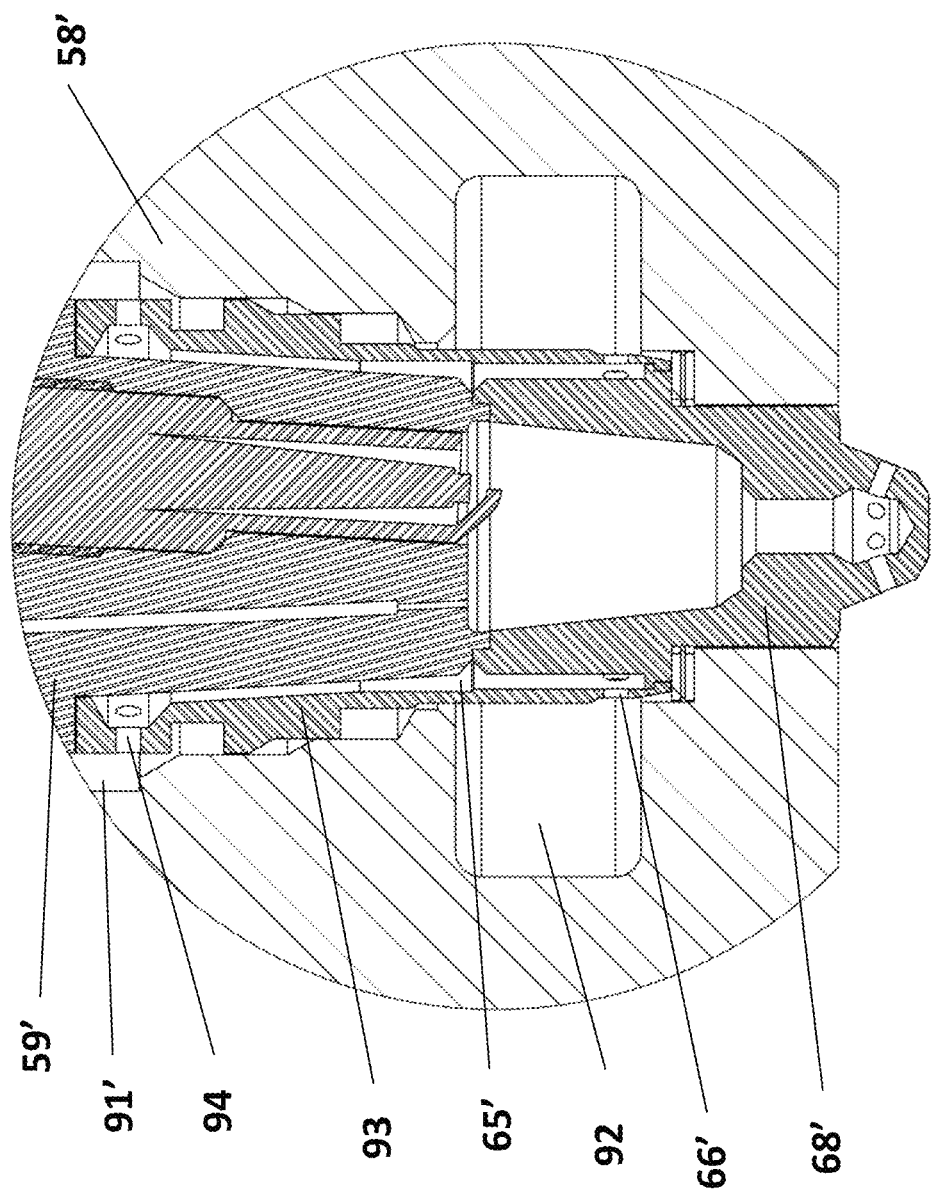
FIG. 13B is an enlarged view of the XXX of the truck engine cylinder head of FIG. 13A.

FIG. 13B is a detail view of FIG. 13A and illustrates a prechamber cooling system that has a separate nozzle 68' and cooling sleeve 93. In this case the coolant is in a single pass configuration starting from the coolant cavity 92, flowing through the radial coolant inlet holes 66', up through the coolant sleeve annulus 65' and exiting the prechamber 59' through radial coolant exit holes 94 into fuel return cavity 91'.

The fifth portion of this detailed description is most closely related to a variable compression ratio mechanism for an OPOC engine. This variable compression ratio system would operate on the outer pistons in the OPOC design.

Figure 14:
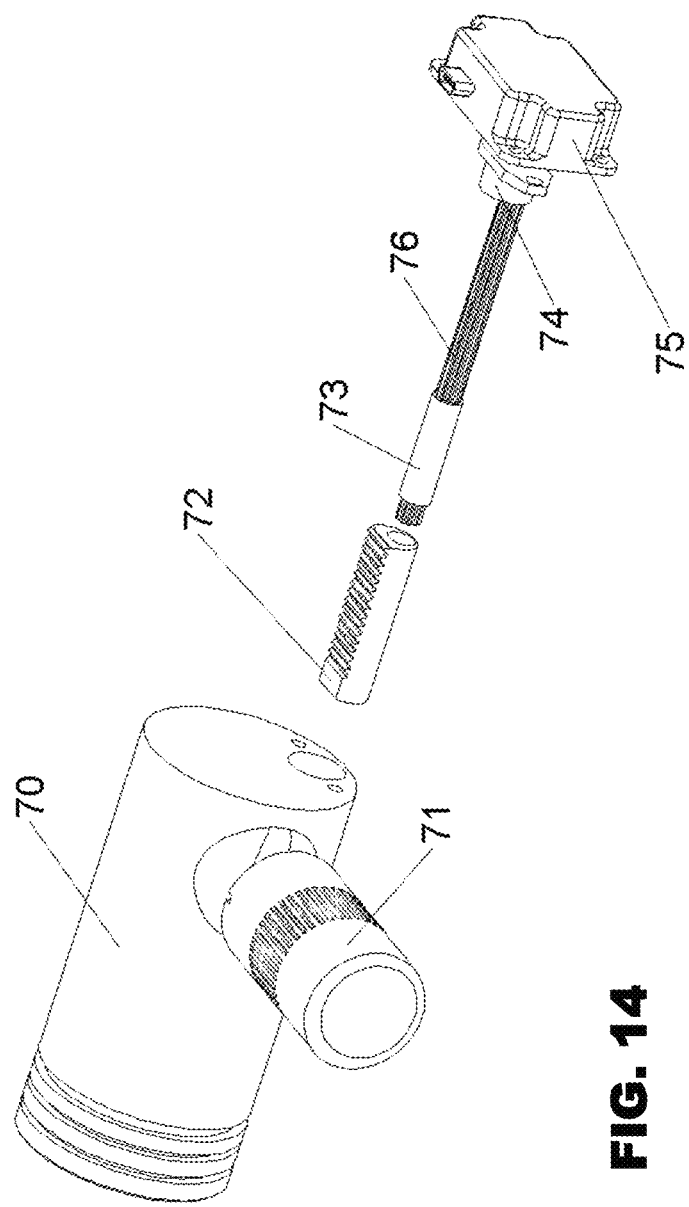
FIG. 14 is an exploded view of an OPOC engine Variable Compression Ratio system.

FIG. 14 is an exploded view of the VCR system. The outer wrist pin 71 slides into the piston 70. There is an offset hole in the outer wrist pin 71 that the inner wrist pin (not shown) would be captured by. It is by rotating this outer wrist pin 71 around the inner wrist pin that the compression ratio is varied. The outer wrist pin 71 has a set of teeth machined into it and these teeth match the teeth cut into the rack gear 72. The rack gear is free to slide axially along a bored hole in the piston 70, as the rack gear 72 moves relative to the piston 70 it rotates the outer wrist pin 71 adjusting the compression ratio. The rack gear 72 has a female threads cut into it and the rack gear threaded insert 73 has a matching male thread on its OD that interfaces with the rack gear 72 internal thread. The rack gear threaded insert 73 is axially restrained in the piston 70 between a boss inside and the threaded insert retainer 74 that bolts to the back of the piston. It is the rack gear threaded insert 73 that positions the rack gear 72 axially in the piston 70 to set the compression ratio. The VCR actuator 75 is attached to the engine end cover and is fixed in place relative to the reciprocating motion of piston 70. It has a male splined shaft 76 that interfaces with the female internal splines inside the rack gear threaded insert 73. As the piston reciprocates inside its cylinder, the rack gear threaded insert 73 slides back and forth over the VCR actuator male splined shaft 76. It is the VRC actuator that sets the compression ratio in each cylinder. In this embodiment there is an actuator for each cylinder in the engine. It would be possible to belt drive multiple spline rod assemblies with one actuator.

In this design both the VCR actuator 75 male splined shaft 76 and the rack gear threaded insert 73 can be replaced as service items without disassembling the engine.

The sixth portion of this detailed description is most closely related to grouped cylinder deactivation on prechamber ignited EMD 2 stroke engines.

FIG. 15A illustrates the firing order of a 12 cylinder EMD 2-stroke engine. The top table is for firing all of the cylinders, the lower table illustrates just one bank firing. In the lower table the engine is broken down into two half engine banks with a top half and bottom half with either half being able to be deactivated leaving behind the rest of the engine to operate on cylinder to cylinder engine timing as even as the full engine was operating. If the top half of the engine operated by itself the firing order would be 1, 7, 3, 9, 2, 8 with degrees between firings 45, 75, 45, 75, 45, 75. Additionally, 9 of the cylinders could be deactivated leaving three cylinders still firing with 120 degree spacing if the three firing cylinders were all from the same quadrant of the engine, either 1, 2, 3 or 4, 5, 6 or 7, 8, 9, or 10, 11, 12.

FIG. 15B is a similar set of engine firing order tables, except for a 16 cylinder engine. In this case, when operating either the top half or bottom half of the engine, the cylinder firing spacing is an even 45 degrees. When only 4 cylinders in one quadrant are operated the cylinder spacing is still even at 90 degrees.

By being able to operate only 25% of the engine or 50% of the engine cylinders, the engine can be tuned to operate at more optimum air fuel ratios all the way down to idle and the prechambers can be turned off in banks with a simple isolation valve for each group of cylinders.

Programming the ECU to not fire the GIV's in the deactivated cylinders is only a matter of software changes. Turning off the prechamber fuel feed to the opposing banks requires some additional hardware, but that can be as simple as two or four electrically controlled valves, one for the fuel supply to each bank of prechambers.

As more advanced systems are proposed to get even lower emissions from these conversion systems, it will be likely that the prechamber supply pressure will not be constant. When the increased complexity of prechamber fuel pressure control is added, that would be a good time to institute this additional layer of control and hardware needed to turn on and off different prechamber feeds.

For simplicity of control or in early deactivation systems, all of the spark plugs can be fired, even those in deactivated cylinders. In more advanced systems it is likely that the spark plugs would not be fired when the cylinders are deactivated to extend the spark plug service lives. When turning on and off the prechamber fuel supply, it may be beneficial to turn the spark plugs on a few cycles early, and when turning off the prechamber fuel supply it would be beneficial to fire the spark plugs a few cycles later.

FIGS. 16A, 17, 18A-18C, 19A-19C, 20, 21, and 22A-22B illustrate a new prechamber nozzle 69" design that uses 6 radial located groups of three 0.050 TJI jets 96 to replace one set of 6 individual larger orifice jets. These three TJI jets 96 in each group converge together at a point some distance, possibly ¾ of an inch, away from the nozzle. This new concept is likely to have both the quenching effect and good combustion chamber penetration. Because the three jets converge they will penetrate further into the combustion chamber similar to a larger single jet. It is likely that the efficiency of the group of jets with regard to penetration would be slightly less than a single larger jet of either the same effective area or combined flow rate. This seeming negative could have a silver lining in that it has the needed penetration, all of the burning gases quenched and at the same time a more concentrated pocket of partially burned combustion radicals to stimulate very rapid combustion throughout the chamber once ignition is started.

Figure 16B:
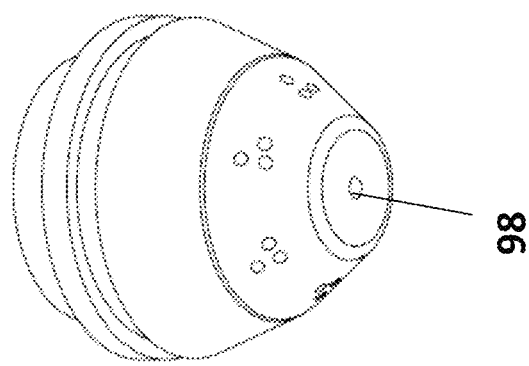
FIG. 16B is an isometric view of a prechamber nozzle with a single axial TJI jet.
Figure 16A:
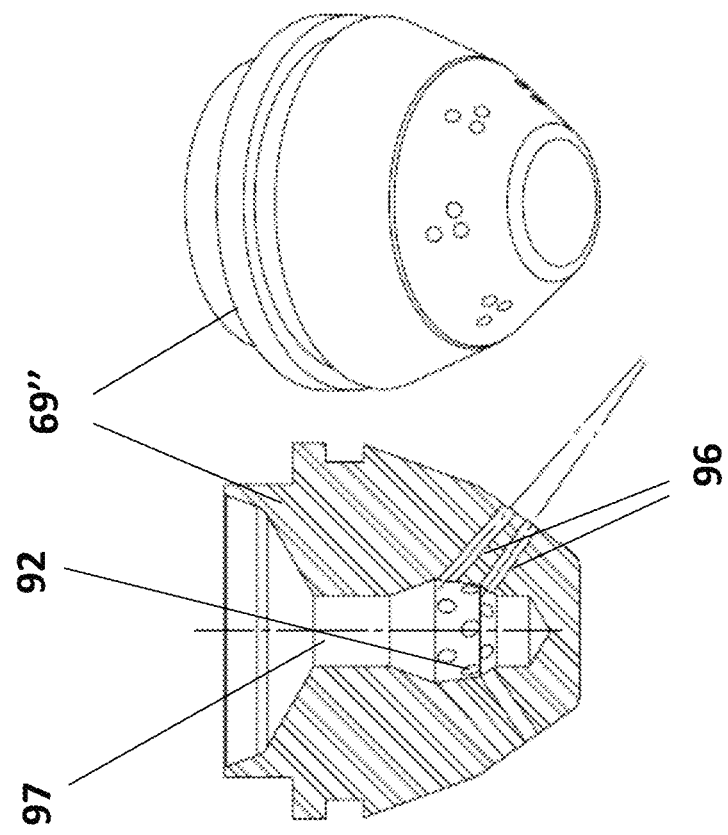
FIG. 16A is a section view of a prechamber nozzle with grouped and offset TJI jets.
Figure 19C:
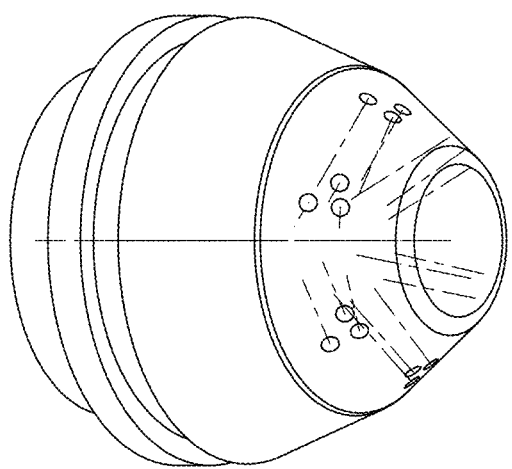
Figure 19B:
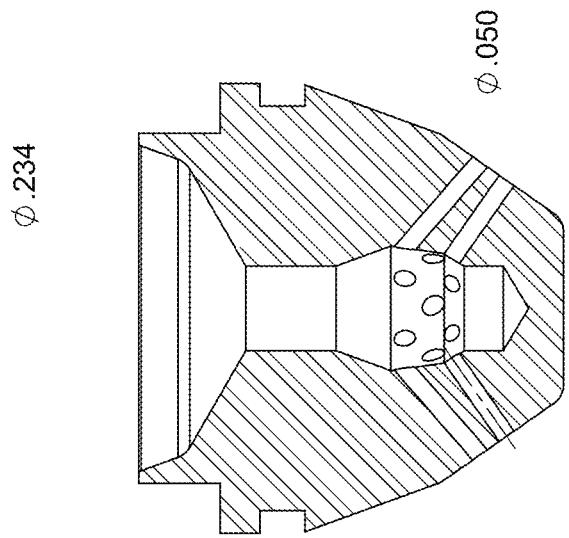
Figure 19A:
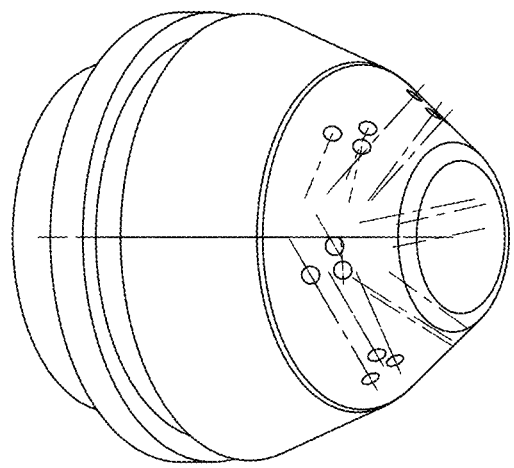
Figure 20:
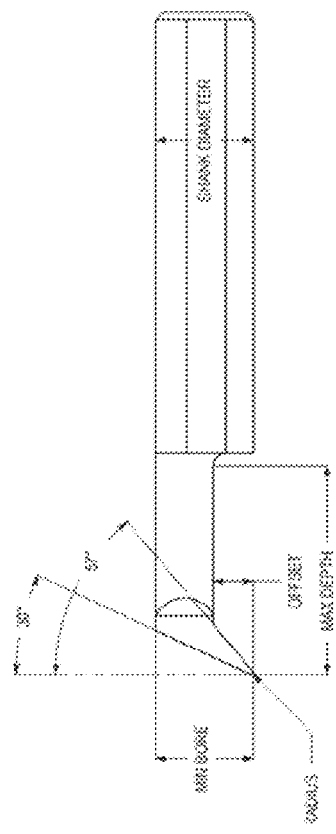
Figure 21:
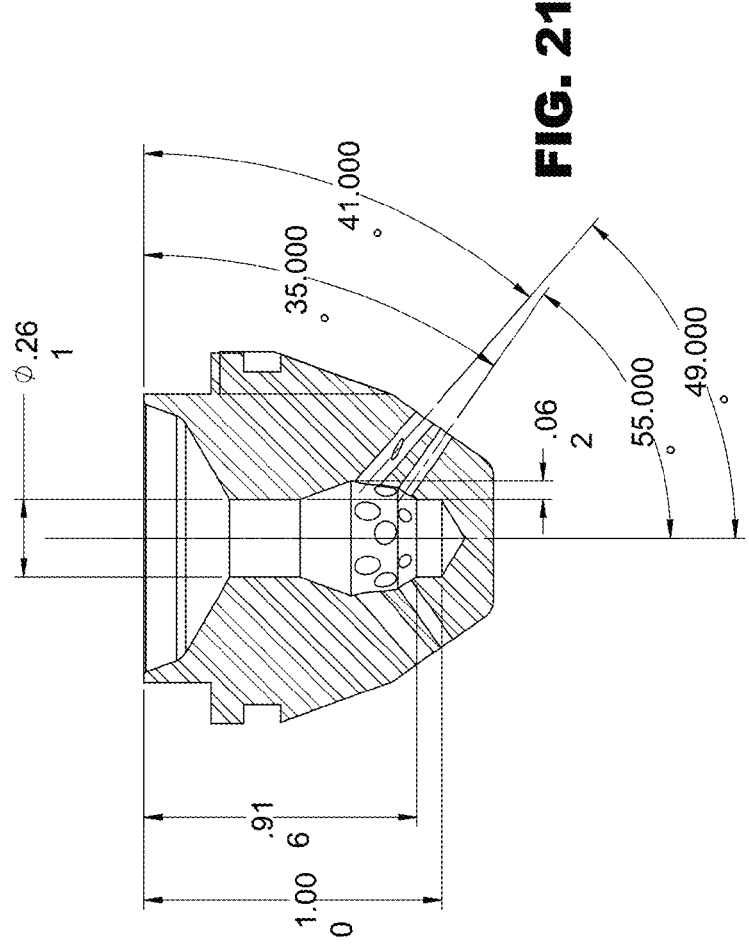
Figure 22A:
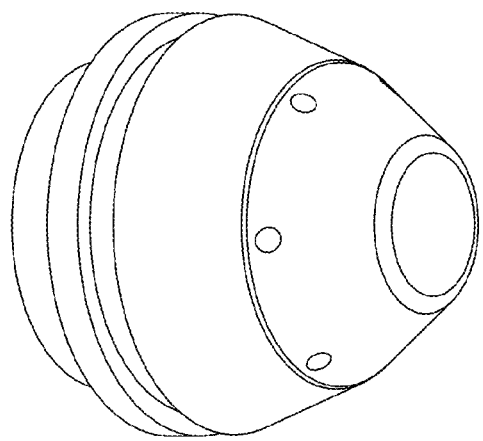
Figure 22B:
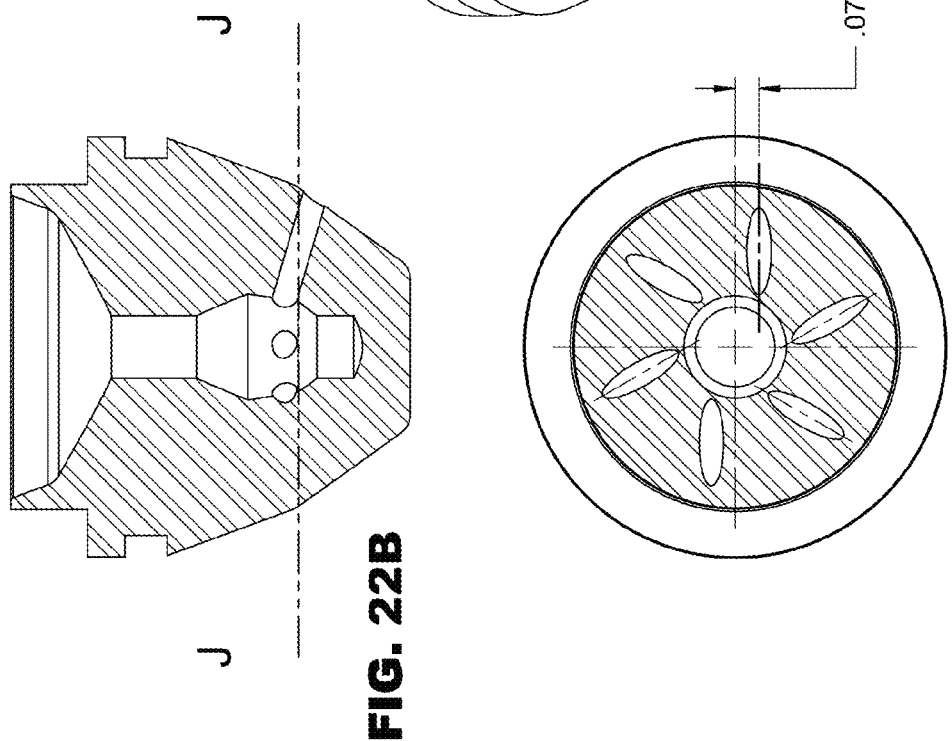

FIG. 16A the Nozzle 69" is illustrated with groups of 3 TJI jets 96 converging into a combined jet. In practice good results could be attained with only two TJI jets 96 in each group or four or more if needed. The concept is to have as many orifice jets as needed converge into a single flow to achieve the required penetration and local combustion intensity.

In another embodiment, it is proposed to have some or all of the TJI jets 96 be offset from the centerline axis of nozzle 69". If a set of jets enters the nozzle throat with the same offset they will give the flow entering the prechamber through the nozzle throat 97 a rotational flow along with the axial flow component. This swirling effect will have multiple benefits.

The first and most intuitive benefit of the swirling flow be improved mixing at the top of the prechamber combustion chamber reducing the stratification of the air and fuel around the spark plug.

Another non-intuitive benefit of the swirling flow entering the prechamber combustion chamber will be the larger effective volume of the flow as it has an axial velocity component and a rotational velocity component. This will require an increase of the mixing throat 97 diameter to have the same effective pressure drop and flow accelerating capability as a smaller throat diameter with a purely axial flow. On the other hand, after combustion when the rotational flow component is much less, the pressure drop across the throat will be less insuring more pressure drop across the jet orifices and higher velocity, mass flow and penetration of the jets. Essentially the mixing throat 97 will now effectively be less restrictive in the most beneficial direction.

A potential issue being explored with multiple small jets in a prechamber nozzle designed for Turbulent Jet ignition is that complete quenching of the burning gasses as they exit may sometimes cause a misfire. At high loads where the in cylinder main chamber temperatures are higher because the gasses have less time to transfer heat to the surrounding metal, the TJI prechambers may exhibit stable combustion.

Proposed is to have TJI jets in both a smaller diameter and a larger diameter. FIG. 16B illustrates one embodiment with groups of smaller diameter TJI jets 96 around the nozzle and then one larger diameter axial TJI jet 98 in the center. In this case the intent is that the axial TJI jet 98 is large enough in diameter to start combustion on its own, and the smaller TJI jets 96 discharged quenched air and fuel forming areas of ready to burn pockets. When the main combustion event is initiated by the larger torch nozzles, these pockets will subsequently ignite providing more rapid heat release. Pure TJI with all quenched jets would offer even higher heat release rates by delaying combustion even further, but could suffer from misfire. This system would overcome some misfire potential at some difficult engine operating points such as very low power. Also in some engines pure TJI may have heat release rates that are too rapid. This system could be used to mitigate that giving some of the benefit of TJI without the excessive heat release rate.

In another embodiment, is to the single axial TJI jet 98 is eliminated and one of the quenched TJI jets 96 in one or several of the radial groups has a larger diameter so as to lose the quenching effect and act as a torch jet.

In another embodiment, the axial jet 98 could be replaced by a set of group of smaller diameter axial jets 98 similar to the radial groupings of TJI jets 96. These axial jets 98 could remain parallel to each other in the axial direction of each be angled slightly off axis to converge.

A second significant benefit of the axial jets 98 is to improve mixing internal to the prechamber. By adjusting the number and diameter of these axial jets 98 both the mixing benefit and the torch effect can be optimized.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A prechamber assembly comprising: a cylinder head including a coolant cavity; a prechamber body located within the cylinder head, the prechamber body including a nozzle and a coolant exit port; and an annular sleeve radially surrounding a portion of the prechamber body, the annular sleeve including a plurality of coolant inlet holes; wherein a portion of the prechamber body is radially spaced from the annular sleeve to form a coolant sleeve annulus extending along a length of the prechamber body above the coolant inlet holes; wherein the coolant cavity and the coolant sleeve annulus are in fluid communication through the plurality of coolant inlet holes; wherein the plurality of coolant inlet holes is positioned towards the end of the coolant sleeve annulus closest to the nozzle and the coolant exit port is positioned near a top of the prechamber body.

2. The prechamber assembly of claim 1 wherein the annular sleeve further includes a plurality of coolant outlet holes, wherein the plurality of coolant inlet holes is positioned towards the end of the coolant sleeve annulus closest to the nozzle.

3. The prechamber assembly of claim 2 wherein the coolant outlet holes are in fluid communication with a coolant return cavity.

4. The prechamber assembly of claim 1 further including a coolant comprising water.

5. The prechamber assembly of claim 1 wherein the prechamber body includes a feed groove distal from the nozzle and in fluid communication with the cooling cavity, wherein the coolant cavity spans from the feed groove to the plurality of coolant inlet holes.

6. The prechamber assembly of claim 1 further including a coolant comprising engine oil.

7. The prechamber assembly of claim 1 wherein the annular sleeve and the nozzle are integral.

8. A prechamber assembly comprising: a cylinder head including a coolant cavity; and a prechamber body located within the cylinder head, the prechamber body including a nozzle and a coolant exit port; wherein the nozzle includes a plurality of jets directing flow through the nozzle at an angle other than parallel or perpendicular relative to a longitudinal centerline axis of the nozzle, wherein the plurality of jets is clustered in groups radially spaced apart from each other around the longitudinal centerline axis of the nozzle; and wherein the coolant exit port is positioned near a top of the prechamber body.

9. The prechamber assembly of claim 8 wherein the groups of jets are equally spaced radially.

10. The prechamber assembly of claim 8 wherein flow through the jets of each group of jets converges at a distance from the nozzle.

11. The prechamber assembly of claim 8 wherein each group of jets comprises two jets.

12. The prechamber assembly of claim 8 wherein the nozzle further includes a centerline jet aligned along the centerline axis.

13. The prechamber assembly of claim 8 wherein the nozzle further includes a centerline group of jets aligned approximately parallel to the centerline axis.

14. The prechamber assembly of claim 8, wherein flow through the centerline group of jets converges at a distance from the nozzle.

15. A prechamber assembly comprising: a cylinder head including a coolant cavity; and a prechamber body located within the cylinder head, the prechamber body including a nozzle and a coolant exit port; wherein the nozzle includes a plurality of jets, each jet aligned along a respective axis that is offset from a centerline axis of the nozzle such that the jet axes do not intersect the centerline axis; wherein the coolant exit port is positioned near a top of the prechamber body.

16. The prechamber assembly of claim 14 wherein the nozzle includes a mixing area, and wherein each jet axis of the plurality of jets is offset an equal distance from the centerline axis such that flow through the plurality of jets causes a rotating flow about the centerline axis in the mixing area of the nozzle.

\* \* \* \* \*